US007650155B2

(12) United States Patent
Matsuda et al.

(10) Patent No.: US 7,650,155 B2
(45) Date of Patent: Jan. 19, 2010

(54) TRANSMISSION TIME DIFFERENCE MEASUREMENT METHOD AND SYSTEM

(75) Inventors: Junichi Matsuda, Minato-ku (JP); Akihisa Kurashima, Minato-ku (JP)

(73) Assignee: NEC Corporation, Tokyo (JP)

(*) Notice: Subject to any disclaimer, the term of this patent is extended or adjusted under 35 U.S.C. 154(b) by 760 days.

(21) Appl. No.: 10/582,369

(22) PCT Filed: Dec. 3, 2004

(86) PCT No.: PCT/JP2004/018052

§ 371 (c)(1),
(2), (4) Date: Jun. 9, 2006

(87) PCT Pub. No.: WO2005/057973

PCT Pub. Date: Jun. 23, 2005

(65) Prior Publication Data

US 2007/0115842 A1 May 24, 2007

(30) Foreign Application Priority Data

Dec. 10, 2003 (JP) ............................. 2003-411320

(51) Int. Cl.
*H04W 24/00* (2009.01)
(52) U.S. Cl. ..................... 455/456.1; 370/252; 370/519
(58) Field of Classification Search ................... None
See application file for complete search history.

(56) References Cited

U.S. PATENT DOCUMENTS

| | | | | | |
|---|---|---|---|---|---|
| 5,828,659 | A | * | 10/1998 | Teder et al. | 370/328 |
| 5,872,774 | A | * | 2/1999 | Wheatley et al. | 370/335 |
| 6,014,376 | A | * | 1/2000 | Abreu et al. | 370/350 |
| 6,920,155 | B2 | * | 7/2005 | Rao | 370/503 |
| 2002/0155845 | A1 | * | 10/2002 | Martorana | 455/456 |

FOREIGN PATENT DOCUMENTS

| | | |
|---|---|---|
| JP | 08-032505 | 2/1996 |
| JP | 2001-517801 | 10/2001 |
| KR | 2001-0034164 A | 4/2001 |
| KR | 2003-0036919 A | 5/2003 |
| WO | WO 99/37037 | 7/1999 |
| WO | WO 02/31989 | 4/2002 |

* cited by examiner

*Primary Examiner*—Ajit Patel
(74) *Attorney, Agent, or Firm*—Sughrue Mion, PLLC

(57) ABSTRACT

The propagation time (1605) of signals between a terminal (1304) and a base station (1302) is calculated from the round-trip time (1601) of signals between the terminal (1304) and the base station (1302) and the turn-around time (1603) from the reception by terminal (1304) of a signal from base station (1302) until the transmission of the signal to the base station (1302). The propagation time (1606) of signals between the terminal (1304) and another base station (1303) is similarly calculated. The difference between the propagation times (1605 and 1606) and the arrival time difference (1607) that is calculated in the terminal (1304) are then compared to calculate the transmission time difference (1608) between the base stations (1302 and 1303).

46 Claims, 18 Drawing Sheets

TRANSMISSION TIME DIFFERENCE MEASUREMENT METHOD AND SYSTEM

This application claims priority from PCT Application No. PCT/JP2004/018052 filed Dec. 3, 2004, and from Japanese Patent Application No. 2003-411320 filed Dec. 10, 2003, which applications are incorporated herein by reference.

TECHNICAL FIELD

The present invention relates to a transmission time difference measurement method and system in the field of mobile communication, and more particularly to a transmission time difference measurement method and system for measuring the differences in transmission times among base stations when determining the geographical location of a mobile station in a mobile communication network.

BACKGROUND ART

In recent years, a multiplicity of methods have been reported as methods of specifying the position of portable telephone terminals (hereinbelow referred to as "terminals"). A number of standardization organizations are standardizing positioning methods and positioning sequences for specifying the positions of terminals.

The Third General Partnership Project (hereinbelow abbreviated as "3GPP"), which is one of the organizations implementing standardization and that has established the standards for W-CDMA, is proceeding with the standardization of positioning methods and positioning sequences. Three positioning methods have already been established in TS25.305, which is the document giving the 3GPP standards: a positioning method that uses signals from GPS satellites; a positioning method that uses signals from base stations; and a positioning method that uses information of the sectors in which terminals are located.

Of the three positioning methods described above, the positioning method that uses signals from base stations uses the time differences of the arrival times of pilot signals from two base stations that have been measured at the terminal to specify the position of the terminal.

However, because base stations do not operate in synchronization in a W-CDMA network, the transmission timing of pilot signals does not coincide. In order to specify the position of a terminal with high accuracy, the time difference in the arrival times of pilot signals that has been measured at the terminal must be corrected by a timing differential of the transmission of the pilot signals from the base stations. This timing differential is referred to as the "Relative Time Difference" and is hereinbelow abbreviated as "RTD."

Two types of methods for measuring RTD are prescribed in TS 25.305, which is the document for the 3GPP standards. The following explanation regards each of these measuring methods.

FIG. 1 is a figure for explaining one of the methods for measuring RTD that have been established by the 3GPP.

The system shown in FIG. 1 is made up from RNC 101 and base stations 102 and 103.

RNC 101 is a device for controlling base stations 102 and 103.

Base stations 102 and 103 are devices that use radio to communicate with terminals (not shown) and operate under the control of RNC 101.

FIG. 2 shows the configuration of RNC 101. FIG. 2 shows only that portion of the configuration that is needed for the explanation.

RNC 101 shown in FIG. 2 is made up from: control unit 301, message processor 302, message transceiver 303, and memory 304.

Control unit 301 serves the role of controlling the RTD measurement sequence and the calculation of the RTD based on the measurement results.

Message processor 302 generates messages in accordance with requests from control unit 301, and issues requests to message transceiver 303 to transmit messages that have been generated. In addition, message processor 302 further checks the content of messages that have been reported from message transceiver 303 and reports the type and content of these messages to control unit 301.

Message transceiver 303 transmits messages in accordance with requests from message processor 302 and reports the reception of messages to message process 302.

Memory 304 stores the RTD.

FIG. 3 shows the configuration of base stations 102 and 103. FIG. 3 shows only those portions of the configuration that are necessary for the explanation.

Base stations 102 and 103 shown in FIG. 3 are each made up from: control unit 401, message processor 402, message transceiver 403, radio signal transceiver 404, transmission timing measurement unit 405, and GPS signal receiver 406.

Control unit 401 issues requests for the transmission of transmission times to transmission timing measurement unit 405 in accordance with the content of messages that are reported from message processor 402. Control unit 401 further issues requests to message processor 402 to generate messages for reporting the results of measurement in transmission timing measurement unit 405.

Message processor 402 generates messages in accordance with requests from control unit 401 and issues requests to message transceiver 403 for the transmission of messages that have been generated. Message processor 402 further checks the content of messages that have been reported from message transceiver 403 and reports the type and content of these messages to control unit 401.

Message transceiver 403 transmits messages in accordance with requests from message processor 402 and reports the reception of messages to message processor 402.

Radio signal transceiver 404 has the capability to transmit radio signals to terminals and to receive radio signals from terminals.

Transmission timing measurement unit 405 measures the transmission times of pilot signals that are transmitted from radio signal transceiver 404 in accordance with requests from control unit 401, and reports the results of measurement to control unit 401. Transmission timing measurement unit 405 further uses GPS times that are reported from GPS signal receiver 406 in the measurement of transmission timings.

GPS signal receiver 406 receives signals from GPS satellites and reports the GPS times that are contained in the received signals to transmission timing measurement unit 405.

FIG. 4 is a view for explaining the sequence when measuring the RTD.

When measuring the RTD, control unit 301 of RNC 101 issues a request to message processor 302 to transmit messages to base stations 102 and 103 requesting the measurement of the transmission times of pilot signals. Upon receiving the request, message processor 302 generates measurement request messages and transmits the measurement request messages to base stations 102 and 103 by way of message transceiver 303 (Step 501a and Step 501b).

Upon receiving the measurement request messages from RNC 101, message transceivers 403 of base stations 102 and 103 report the reception of the messages and the content of the received messages to respective message processors 402. Each message processor 402 refers to the content of the reported message, recognizes the reception of the measurement request message from RNC 101, and notifies control unit 401 of the reception of a measurement request message from RNC 101.

Having received the report of the measurement request message, control unit 401 checks the content of the measurement request. In this case, control unit 401 verifies that the measurement of the transmission timings of pilot signals has been requested and issues a request to transmission timing measurement unit 405 for the measurement of the transmission timings.

Upon receiving the request for measurement, transmission timing measurement unit 405 measures the transmission timings of pilot signals that have been transmitted from radio signal transceiver 405 (Step 502a and Step 502b.) The transmission timings are represented by the GPS time that is reported from GPS signal receiver 406. After measurement has been completed, transmission timing measurement unit 405 reports the measurement result to control unit 401.

Control unit 401, having been notified of the result of the measurement of the transmission timings, issues a request to message processor 402 for the transmission of a message to report the measurement results to RNC 101. Message processor 402, having received the request, generates a measurement result report message and issues a request to message transceiver 403 to transmit the generated message. Message transceiver 403, having received the request for message transmission, transmits the measurement result report message to RNC 101 (Step 503a and Step 503b).

Message transceiver 303 of RNC 101 reports the reception of the message and the content of the received message to message processor 302. Message processor 302, having received this notification, checks the content of the message and reports the reception of the measurement result report message from base station 102 or base station 103 to control unit 301. At this time, message processor 302 simultaneously reports the measurement results to control unit 301.

Control unit 301 calculates the difference in the transmission timings that have been reported from base stations 102 and 103, computes the RTD, and stores the RTD in memory 304 (Step 504).

FIG. 5 is a view for explaining another RTD measurement method that has been established by 3GPP. This method uses measurement nodes referred to as Location Measurement Units (hereinbelow abbreviated as "LMU").

The system shown in FIG. 5 is made up from: RNC 601, base stations 602 and 603, and LMU 604.

RNC 601 is a device for realizing control of base stations 602 and 603. RNC 601 is of identical configuration to RNC 101 and explanation of the configuration is therefore here omitted.

Base stations 602 and 603 are devices that use radio lines to realize communication with terminals (not shown) and operate under the control of RNC 601. In addition, base stations 602 and 603 are of the same configuration as base stations 102 and 103, and explanation of their configuration is therefore here omitted. In addition, RNC 601 recognizes the geographical location of base stations 602 and 603.

LMU 604 is a device for measuring the reception timings of pilot signals that are transmitted from base stations 602 and 603. RNC 601 further recognizes the geographical location of LMU 604.

FIG. 6 is a view showing the configuration of LMU 604.

LMU 604 shown in FIG. 6 is made up from: control unit 701, message processor 702, message transceiver 703, radio signal transceiver 704, and reception timing measurement unit 705.

Control unit 701 issues requests to reception timing measurement unit 705 for the measurement of the reception timings of pilot signals in accordance with the content of messages that are reported from message processor 702. Control unit 701 further issues requests to message processor 702 for the generation of messages to report the results of measurement in reception timing measurement unit 705.

Message processor 702 generates messages in accordance with requests from control unit 701 and issues requests to message transceiver 703 for the transmission of generated messages. Message processor 702 further checks the content of messages that are reported from message transceiver 703 and reports the type and content of the messages to control unit 701.

Message transceiver 703 transmits messages in accordance with requests from message processor 702 and reports the reception of messages to message processor 702.

Radio signal transceiver 704 has the capability to transmit radio signals to base stations 602 and 603 and to receive radio signals from base stations 602 and 603.

FIG. 7 is a view for explaining the sequence for the RTD measurement that uses LMU 604.

When measuring the RTD, control unit 301 of RNC 601 issues a request to message processor 302 to transmit a message to LMU 604 requesting the measurement of the time difference of the reception times of pilot signals received from base stations 602 and 603. Upon receiving the request, message processor 302 generates a measurement request message and transmits the measurement request message to LMU 604 by way of message transceiver 303 (Step 801). At this time, message processor 302 simultaneously reports to LMU 604 information by which LMU 604 specifies base stations 602 and 603 that are to be the objects of measurement.

Upon receiving the measurement request message from RNC 601, message receiver 703 of LMU 604 reports the reception of the message and the content of the received message to message processor 702. Message processor 702 refers to the content of the reported message to verify that a measurement request message has been received from RNC 601, and reports the reception of the measurement request message from RNC 601 to control unit 701.

Control unit 701, having been notified of the measurement request message, checks the content of the measurement request. In this case, control unit 701 recognizes that measurement of the time difference between the reception times of pilot signals has been requested and issues a request to reception timing measurement unit 705 for the measurement of the reception times of the pilot signals received from base stations 602 and 603.

Reception timing measurement unit 705, having received the request for measurement, measures the reception times of the pilot signals received at radio signal transceiver 704 for each of base stations 602 and 603 (Step 802).

Control unit 701, having been notified of the results of measuring the reception times, takes the difference between the reception times of the pilot signals from each of base stations 602 and 603, and calculates the time difference. Control unit 701 then issues a request to message processor 702 for the transmission of a message to report the calculation results to RNC 601. Message processor 703, having received this request, generates a measurement result report message and issues a request to message transceiver 703 for the transmission of the generated message. Message transceiver 703, having received the request for transmission of the message, transmits the measurement result report message to RNC 601 (Step 803).

Message transceiver 303 of RNC 601 reports the reception of the message and the content of the received message to message processor 302. Message processor 302, having received the report, checks the content of the message and reports the reception of the measurement result report message from LMU 604 to control unit 301. At this time, message processor 302 simultaneously reports the measurement results to control unit 301.

In control unit 301, the distance between LMU 604 and base station 602 and the distance between LMU 604 and base station 603 are calculated based on the geographical locations of base stations 602 and 603 and the geographical location of LMU 604, and further, the difference in propagation times is calculated based on the calculated distances. Control unit 301 then compares the time difference of the reception times that have been reported from LMU 604 with the difference in propagation times to calculate the RTD and stores the calculation results in memory 304 (Step 804).

In addition, in a mobile communication network such as a W-CDMA network, a technique known as "soft hand-over" is used to support conversation or data communication during movement. Soft hand-over is a method of simultaneously using a plurality of base stations to communicate whereby, even when communication becomes impossible with one base station, communication can be continued with the remaining base stations.

FIG. 8 is a figure for explaining soft hand-over.

The system shown in FIG. 8 is made up from RNC 901, base stations 902 and 903, and terminal 904.

RNC 901 is a device for controlling base stations 902 and 903 and terminal 904. RNC 901 is of the same configuration as RNC 101, and explanation of configuration is therefore here omitted.

Base stations 902 and 903 are devices that use radio lines to communicate with terminal 904 and that operate under the control of RNC 901. Base stations 902 and 903 are of the same configuration as base stations 102 and 103, and explanation of the configuration is therefore here omitted.

Terminal 904 is a device used for conversation or data communication between users and communicates by establishing a connection with RNC 901 by way of base station 902 or base station 903.

FIG. 9 shows the configuration of terminal 904. FIG. 9 shows only those portions that are necessary for the explanation.

Terminal 904 shown in FIG. 9 is made up from: control unit 1001, message processor 1002, message transceiver 1003, radio signal transceiver 1004, signal measurement unit 1005, and radio link control unit 1006.

Control unit 1001 issues requests to signal measurement unit 1005 to measure the reception quality of pilot signals. Control unit 1001 further issues requests to message processor 1002 to generate messages for reporting the measurement results of signal measurement unit 1005.

Message processor 1002 generates messages in accordance with requests from control unit 1001 and issues requests to message transceiver 1003 to transmit generated messages. Message processor 1002 further checks the content of messages that have been reported from message transceiver 1003 and reports the type and content of these messages to control unit 1001.

Message transceiver 1003 transmits messages in accordance with requests from message processor 1002 and reports the reception of messages to message processor 1002.

Radio signal transceiver 1004 has the capability for transmitting radio signals to base stations that have been designated from radio link control unit 1006 and for receiving radio signals from base stations that have been designated from radio link control unit 1006. Radio signal transceiver 1004 further has the capability for receiving pilot signals from base stations for which reception is possible but that have not been designated from radio link control unit 1006.

In accordance with requests of control unit 1001, radio link control unit 1006 designates to radio signal transceiver 1004 the base stations that are to transmit and receive signals.

FIG. 10 is a view for explaining a sequence that is executed between terminal 904 and base stations 902 and 903 when carrying out a soft hand-over.

Control unit 1001 of terminal 904 issues a request to signal measurement unit 1005 to measure the quality of pilot signals that are being received by radio signal transceiver 1004. Signal measurement unit 1005, having received the request to measure signal quality, measures the reception quality of all pilot signals that are being received by radio signal transceiver 1004 and reports the measurement results to control unit 1001 (Step 1201).

Control unit 1001, having received the measurement results that are reported from signal measurement unit 1005, specifies the base stations of base stations 902 and 903 that are transmitting signals having quality equal to or greater than a predetermined quality, and reports to message transceiver 1002 the generation of a message for reporting to RNC 901 the specified base stations and the reception quality of pilot signals from those base station. In this case, it is assumed that the reception quality of pilot signals that are received from base stations 902 and 903 exceeds the predetermined reception quality, and RNC 901 is notified that base stations 902 and 903 exceed the predetermined reception quality and is further notified of the reception quality of each base station.

Message processor 1002, having received the request from control unit 1001 to transmit a message, issues a request to message transceiver 1003 to transmit a measurement result report message to report the measurement results. Message transceiver 1003, having received the request from message processor 1002 to transmit a message, generates a measurement result report message and transmits the generated message by way of radio signal transceiver 1004 (Step 1202).

Message transceiver 303 of RNC 901, having received the report from terminal 904, reports the reception of the message to message processor 302; message processor 302 that receives the report recognizes that the message is a measurement result report message from terminal 904 and reports the reception of the measurement result report message and the reported measurement result to control unit 301.

Control unit 301 refers to the reported measurement result to verify whether the reported reception quality of pilot signals from the base station is equal to or greater than the predetermined quality (Step 1203). In this case, it is assumed that the reception quality of pilot signals that are received from base stations 902 and 903 is equal to or greater than the predetermined value.

Control unit 301 issues a request to message processor 302 to transmit a message to base stations 902 and 903 requesting the securing of radio resources required for radio communication with terminal 904. Message processor 302, having received the request, generates a resource request message and issues a request to message transceiver 303 to transmit the generated message. Message transceiver 303, having received the request, transmits the requested message to base stations 902 and 903 (Step 1204).

Upon receiving the resource request message, message transceivers 403 of each of base stations 902 and 903 report the reception of the message to message processors 402. Each message processor 402 that has received the report recognizes that the message is a resource request message and reports the reception of the resource request message to control unit 401.

Control unit 401 issues a request to radio signal transceiver 404 to secure radio resources, and radio signal transceiver 404 secures the radio resources (Step 1205). When radio resources have been secured, control unit 401 issues a request to message processor 402 to transmit a message to report to RNC 901 that radio resources have been secured.

Message processor 402 generates a resource securing completed message and issues a request to message transceiver 403 to transmit the generated message. Message transceiver 403 that receives the request transmits the resource securing completed message to RNC 901 (Step 1206).

Message transceiver 303 of RNC 901 that has received the resource securing completed message reports the reception of the message to message processor 302. Message processor 302 recognizes that the received message is a resource securing completed message and reports to control unit 301 that a resource securing completed message has been received from base stations 902 and 903.

Control unit 301, upon verifying that radio resources have been secured, issues a request to message processor 302 to transmit a message to change the settings of terminal 904 to use base stations 902 and 903 for communication. Message processor 302, having received the request, generates a setting change message and issues a request to message transceiver 303 to transmit the generated message. Message transceiver 303 transmits the setting change message to terminal 904 (Step 1207).

Message transmitter 1003 of terminal 904, upon receiving the setting change message by way of radio signal transceiver 1004, reports the reception of the message to message processor 1002. Message processor 1002 recognizes that the received message is a setting change message and reports to control unit 1001 the reception of the setting change message and the content of the change. In this case, it is assumed that the notification indicates changes such that both of base stations 902 and 903 are used simultaneously in the exchange of messages with RNC 901.

Control unit 1001, having received the notification, issues a request to radio link control unit 1006 to change the settings such that base stations 902 and 903 can both be used in the transmission and reception of data and voice signals. Radio link control unit 1006, having received the request, changes the settings of radio signal transceiver 1004 such that base stations 902 and 903 can both be used in the exchange of messages with RNC 901 (Step 1208). Upon completion of the settings, terminal 904 is able to use both of base stations 902 and 903 simultaneously to carry out communication with RNC 901.

However, in the RTD measurement method that uses GPS times that is established by the 3GPP standardization document TS 25.301, the problem exists that hardware that can receive GPS signals must be mounted in a base station.

In addition, although RTD measurement that uses LMUs such as prescribed in TS 25.301 can be considered, this approach also has the drawback that a plurality of LMUs must be newly installed.

DISCLOSURE OF THE INVENTION

It is an object of the present invention to provide a technology that allows the measurement of transmission timing differences among base stations without necessitating the introduction of new hardware or the installation of new nodes in a base station.

The present invention for solving the above-described problem is a transmission time difference measurement method in a system that includes a terminal, two or more base stations that each operate asynchronously, and a control device for controlling the terminal and each of the base stations, the method having as an object the calculation of differences in transmission times of signals in each of the base stations, the method including steps wherein:

when the terminal is able to simultaneously receive the signals from each of the base stations, each of the base stations uses a round trip time measurement function to measure the round trip times of signals to and from the terminal;

the terminal uses a turn-around time measurement function to measure, for each of the base stations, the turn-around time from the reception of a signal from one of the base stations until the transmission of a signal to that base station;

the terminal uses an arrival time difference measurement function to measure the arrival time difference, which is the difference between the times that signals arrive from each of the base stations;

and the control device finds the difference in the transmission times of signals in each of the base stations based on: the difference of propagation times between the terminal and each of the base stations that is calculated by subtracting the turn-around time that is measured in the terminal from the round trip times that are measured in each of the base stations, and the arrival time difference that is measured in the terminal; and uses a storage function to store the calculated transmission time differences in association with calculation times at which the transmission time differences were calculated.

According to the present invention, in a mobile communication network such as a W-CDMA network in which the transmission timings of pilot signals from base stations are not in synchronization, the arrival time differences of pilot signals can be used to measure the transmission timing differences among base stations without necessitating the introduction of new hardware.

BEST MODE FOR CARRYING OUT THE INVENTION

The present invention is applied to a transmission time difference measurement system that includes a terminal, two or more base stations that each operate asynchronously, and a control device for controlling the terminal and each of the base stations.

The control device includes: a measurement request function for issuing requests to the terminal and to each of the base stations to perform measurement; and a storage function for storing the transmission time differences of the signals of base stations in association with the calculation times at which the transmission time differences have been calculated. In addition, each of the base stations includes a round trip time measurement function for, upon receiving a measurement request that is issued when the control device uses the measurement request function to transmit a measurement request, measuring the round trip time of signals to and from the terminal. Each terminal further includes a turn-around time measurement function for, upon receiving a measurement request that is transmitted when the control device uses the measurement request function, measuring the turn-around time from the reception of a signal from a base station until the transmission of the signal to that base station; and an arrival time difference measurement function for measuring the arrival time difference, which is the difference in the times of arrival of signals from at least two base stations.

When the terminal is able to simultaneously receive signals from each of the base stations, each of the base stations uses the round trip time measurement function to measure the round trip time, and the terminal uses the turn-around time measurement function to measure the turn-around time for each of the base stations. The terminal further uses the arrival time difference measurement function to measure the arrival time difference. The control device then finds the transmission time differences of signals in each of the base stations based on: the differences in propagation times between the terminal and each of the base stations that are calculated by subtracting the turn-around time that has been measured at the terminal from the round trip times that have been measured in each of the base stations and the arrival time difference that is measured at the terminal, and uses the storage function to store the calculated transmission time differences.

The following explanation relates to a specific working example.

FIRST WORKING EXAMPLE

Figure 11:
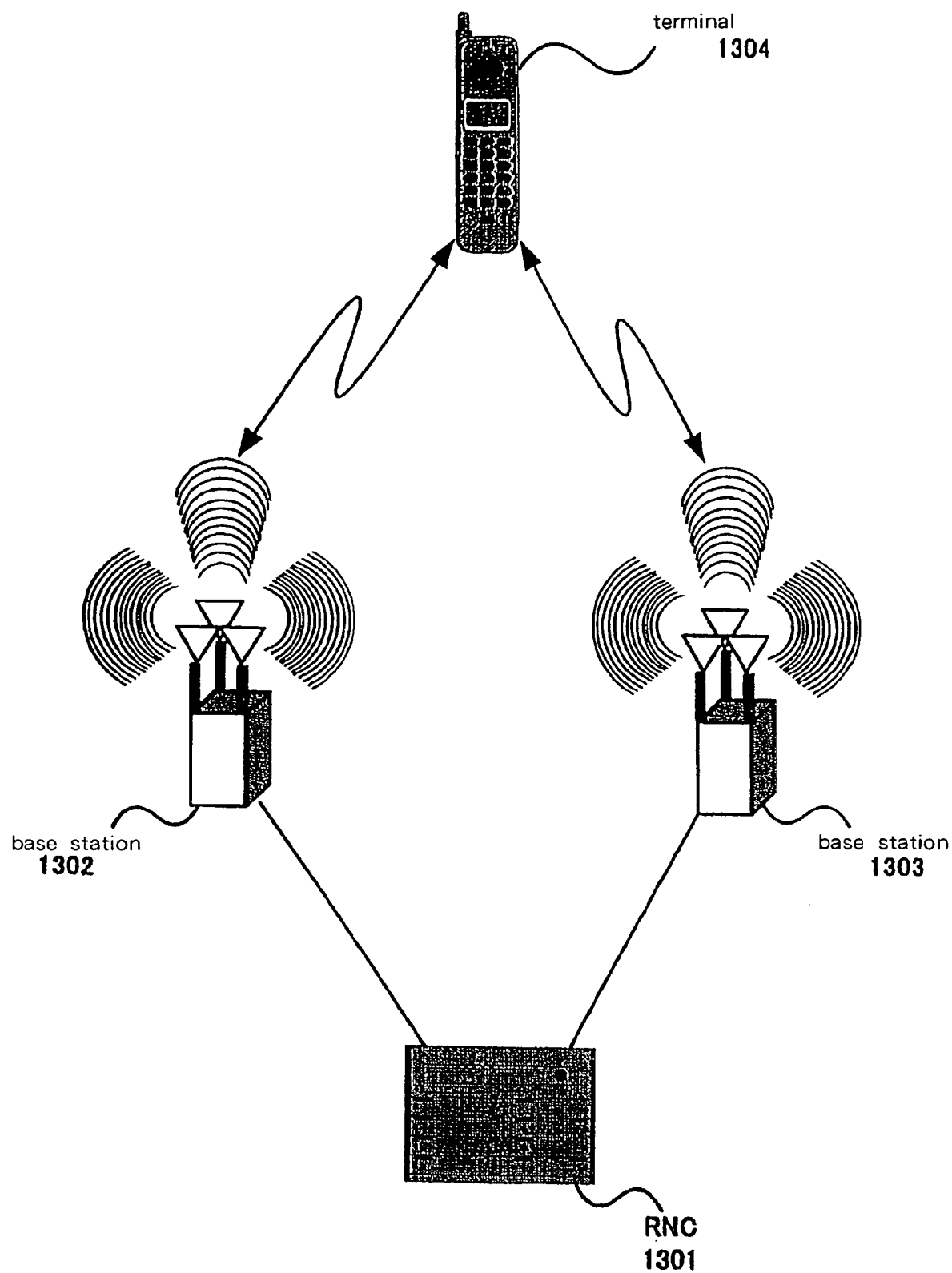
FIG. 11 shows the configuration of the transmission time difference measurement system in the first to ninth working examples of the present invention.

FIG. 11 shows the configuration of the transmission time difference measurement system in the first working example of the present invention.

The transmission time difference measurement system shown in FIG. 11 is made up from: RNC 1301, base stations 1302 and 1303, and terminal 1304.

RNC 1301 uses messages to control base stations 1302 and 1303.

Base stations 1302 and 1303 exchange radio signals with terminal 1304.

Terminal 1304 establishes a connection with RNC 1301 and is controlled by RNC 1301 through the transmission and reception of messages with RNC 1301.

Figure 12:
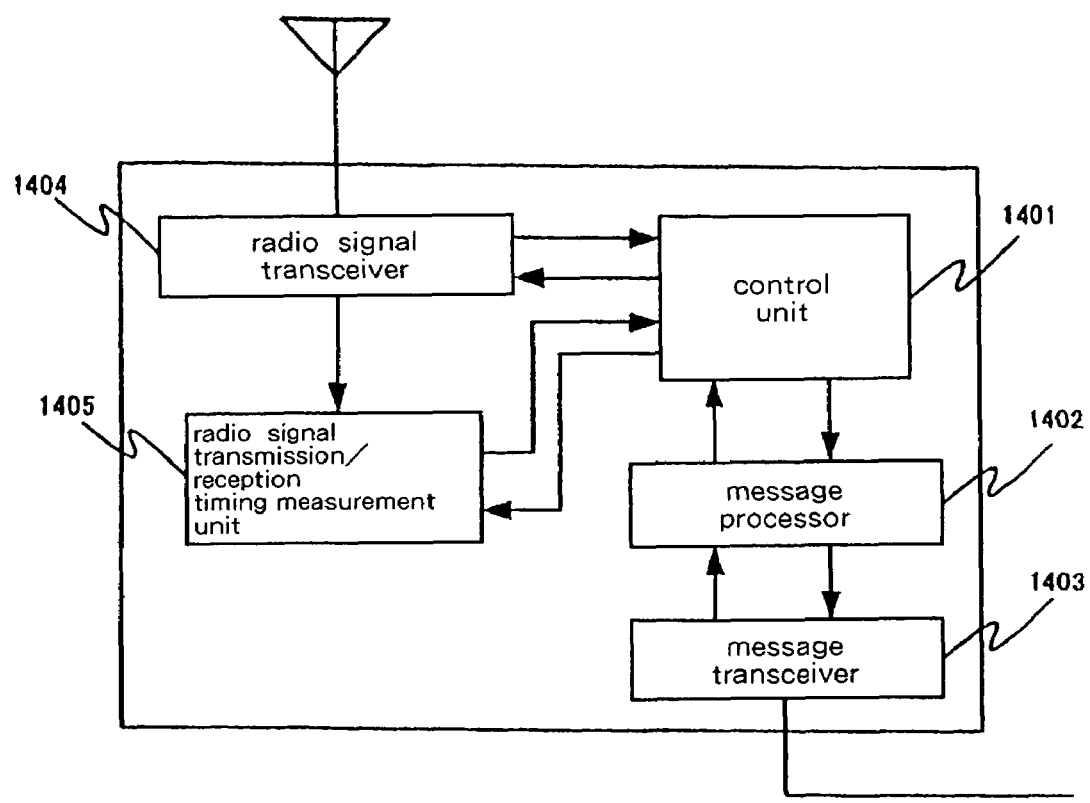
FIG. 12 shows the configuration of base stations 1302 and 1303 shown in FIG. 11.

FIG. 12 shows the configuration of base stations 1302 and 1303 in the first working example of the present invention. FIG. 12 shows only those portions necessary for the explanation.

Base stations 1302 and 1303 shown in FIG. 12 are made up from: control unit 1401, message processor 1402, message transceiver 1403, radio signal transceiver 1404, and radio signal transmission/reception timing measurement unit 1405.

Based on the type of message that has been received and the content that is contained in the message that is reported from message processor 1402, control unit 1401 issues a request to radio signal transmission/reception timing measurement unit 1405 to measure the transmission/reception timings, and based on the measurement results, calculates the round trip time with terminal 1301. The Round Trip Time is hereinafter abbreviated as "RTT."

Message processor 1402 generates messages in accordance with requests from control unit 1401 and issues requests to message transceiver 1403 to transmit the generated messages. Further, when the reception of a message is reported from message transceiver 1403, message processor 1402 checks the type of message and notifies control unit 1401 of the type of message that has been received and the content of the message.

Message transceiver 1403 transmits the messages that are requested from message processor 1402 to RNC 1301. When a message is received from RNC 1301, message transceiver 1403 reports the reception of the message to message processor 1402.

Figure 13:
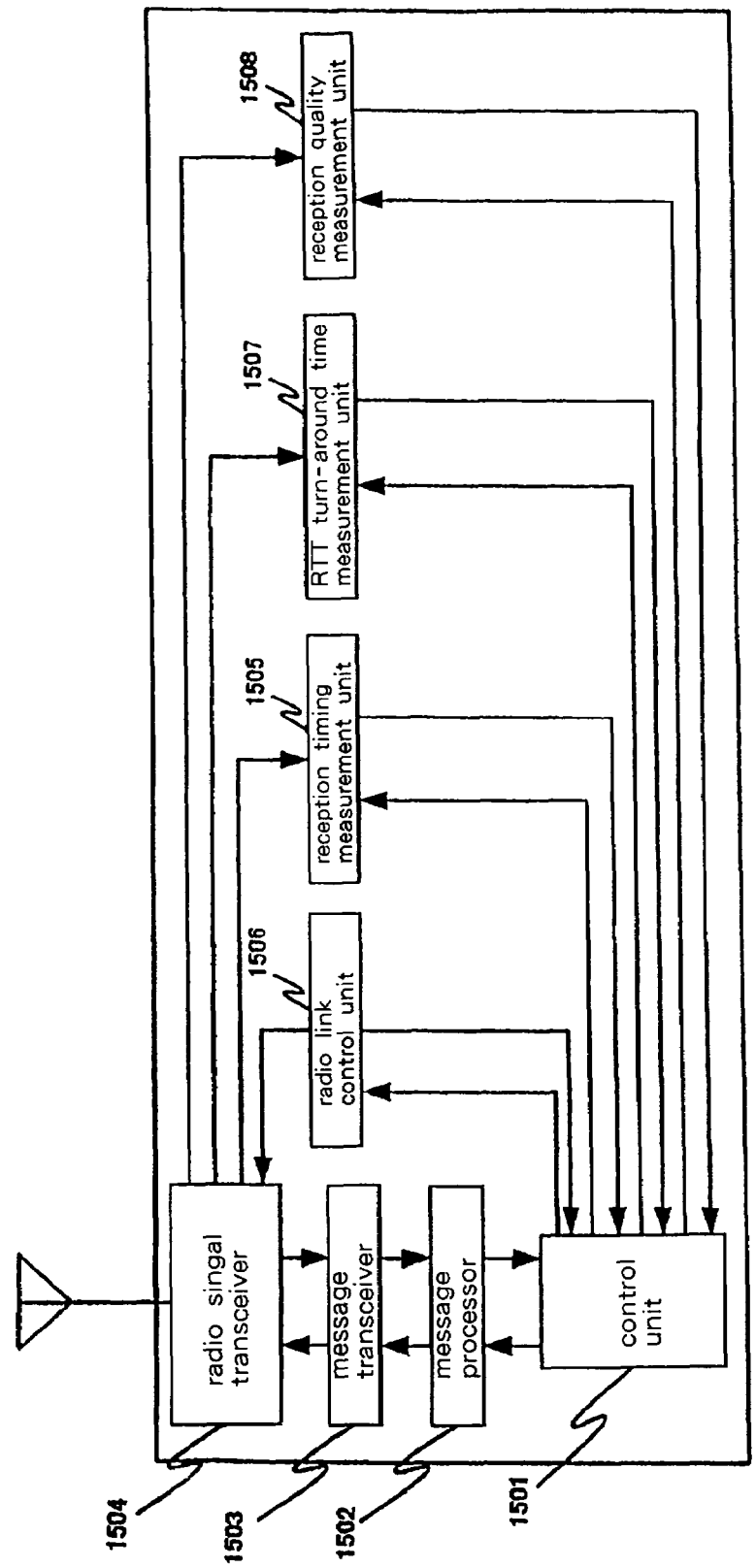
FIG. 13 shows the configuration of terminal 1304 shown in FIG. 11.

FIG. 13 shows the configuration of terminal 1304 in the first working example of the present invention. In FIG. 13, only those portions necessary to the explanation are shown.

Terminal 1304 shown in FIG. 13 is made up from: control unit 1501, message processor 1502, message transceiver 1503, radio signal transceiver 1504, reception timing measurement unit 1505, radio link control unit 1506, RTT turn-around time measurement unit 1507, and reception quality measurement unit 1508.

Control unit 1501 controls the operation of radio link control unit 1506, reception timing measurement unit 1505, and RTT turn-around time measurement unit 1507 in accordance with the type and content of received messages that are reported from message processor 1502. In addition, control unit 1501 calculates the arrival time differences of pilot signals based on the measurement results that are reported from reception timing measurement unit 1505. Control unit 1501 further issues requests to message processor 1502 to transmit messages to report the calculated arrival time differences or the measurement results that are reported from RTT turn-around time measurement unit 1507.

Message processor 1502 generates messages for which transmission has been requested from control unit 1501 and issues requests to message transceiver 1503 to transmit the generated messages. In addition, message processor 1502 checks the type of messages for which reception is reported from message transceiver 1503 and reports the type and content of the received messages to control unit 1501.

Message transceiver 1503 transmits messages for which transmission has been requested from message processor 1502 to RNC 1301 by way of radio signal transceiver 1504. Message transceiver 1503 further reports to message processor 1501 the reception quality of messages from RNC 1301 that have been received by way of radio signal transceiver 1504.

Radio signal transceiver 1504 converts messages for which transmission has been requested from message transceiver 1503 to radio signals and transmits these radio signals into space. Radio signal transceiver 1504 further receives radio signals from space and reports the received signals to message transceiver 1503.

Reception timing measurement unit 1505 measures the reception times of pilot signals from the base stations that have been designated from control unit 1501 and reports the measurement results to control unit 1501.

Radio link control unit 1506 sets the base stations that are to be used when radio signal transceiver 1504 implements communication in accordance with requests from control unit 1501.

RTT turn-around time measurement unit 1507 measures the time from receiving a signal from base station 1302 that is designated from control unit 1501 until the transmission of the signal to that base station and reports the measurement result to control unit 1501.

Reception quality measurement unit 1508 measures the reception quality of pilot signals from all base stations that radio signal transceiver 1504 receives in accordance with requests from control unit 1501, and reports the measurement results to control unit 1501.

Figure 1:
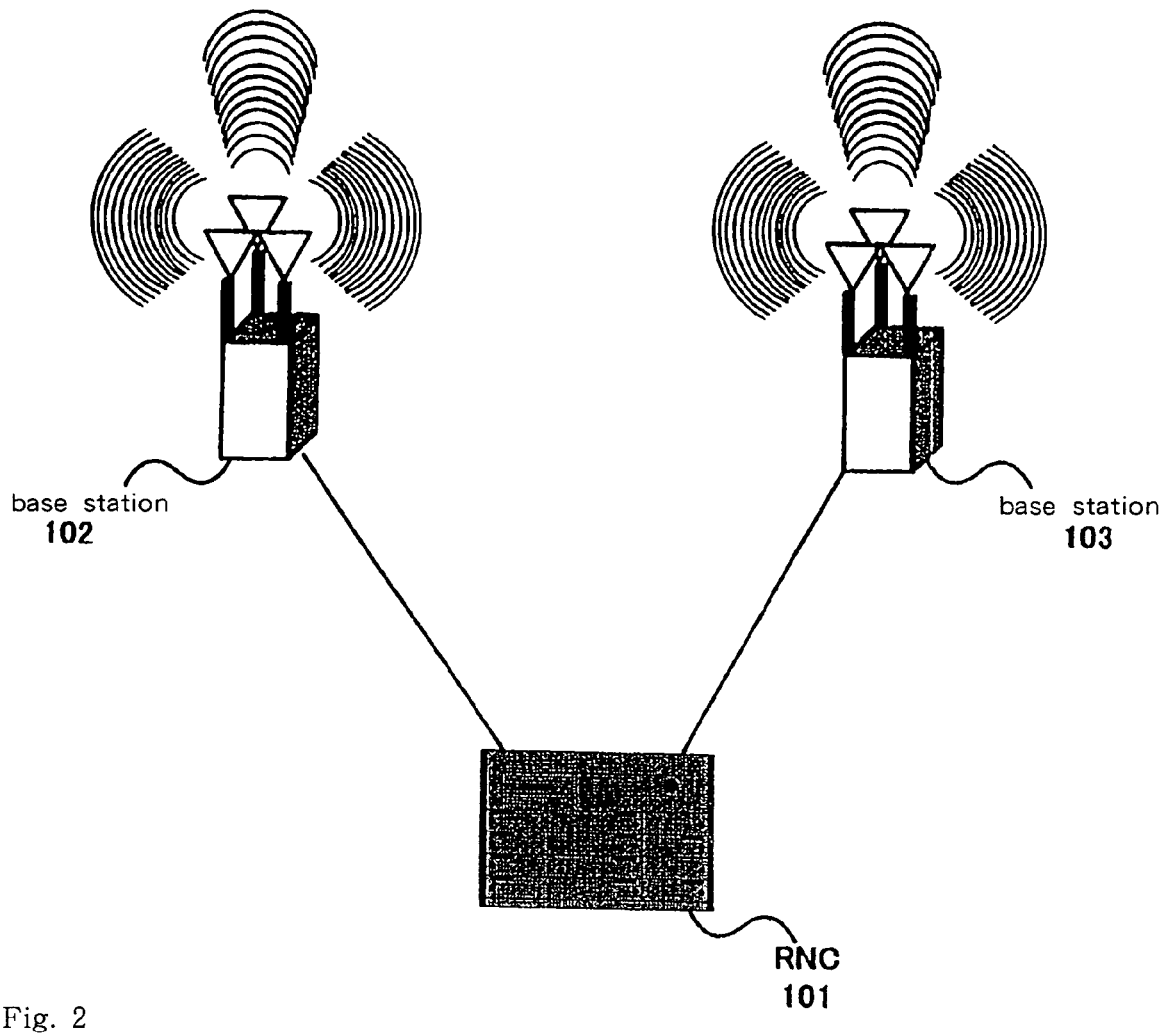
FIG. 1 is a view for explaining one example of an RTD calculation method that has been established by 3GPP.
Figure 2:
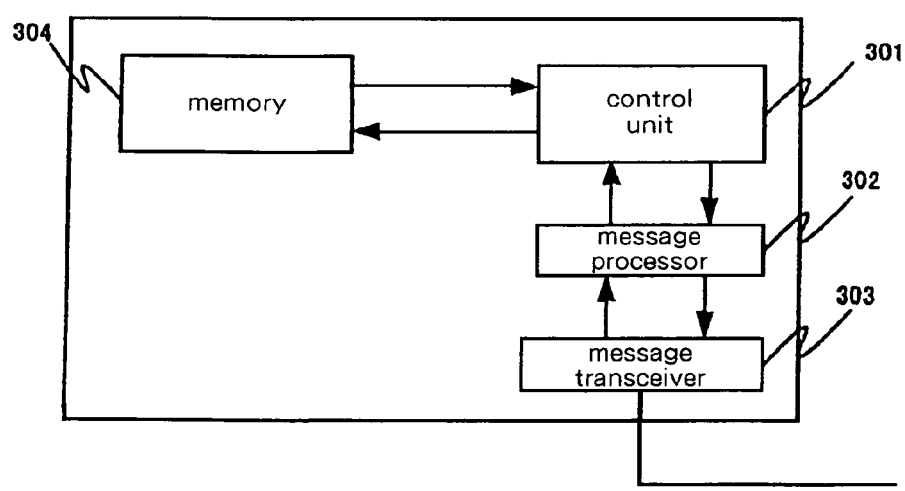
FIG. 2 is a view showing the configuration of RNC 101 shown in FIG. 1.
Figure 3:
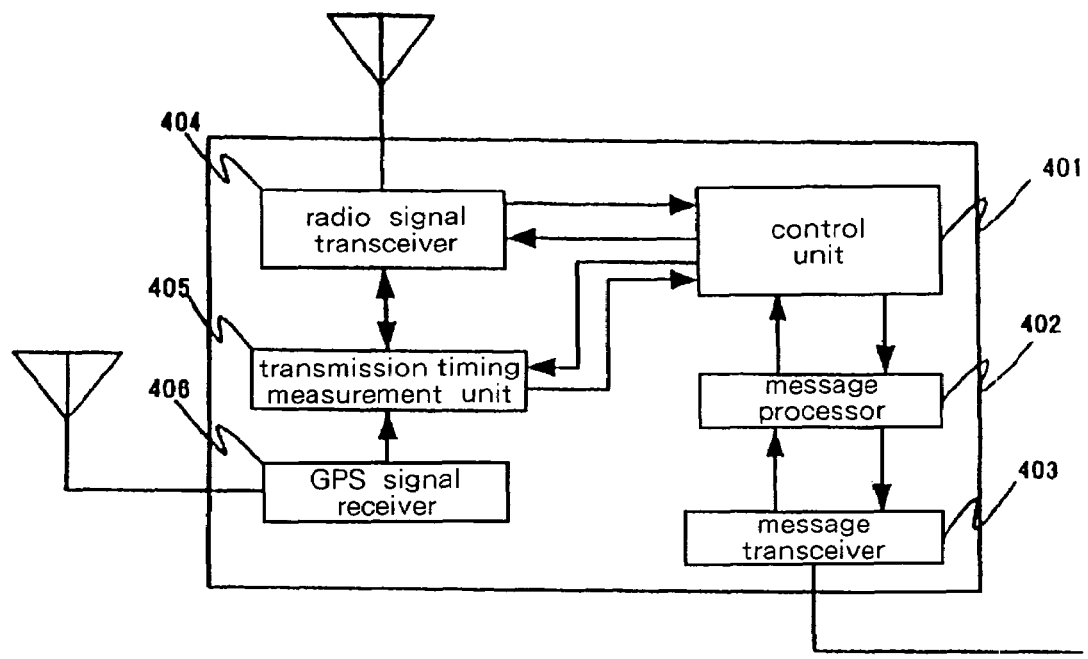
FIG. 3 shows the configuration of base stations 102 and 103 shown in FIG. 1.
Figure 4:
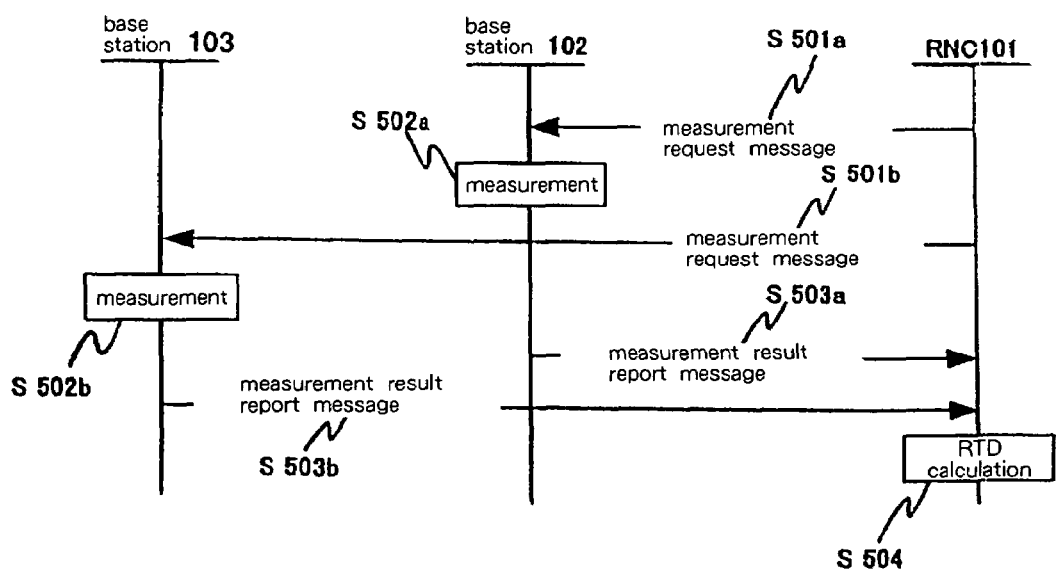
FIG. 4 is a view for explaining the sequence of one example of an RTD calculation method that has been established by 3GPP.
Figure 5:
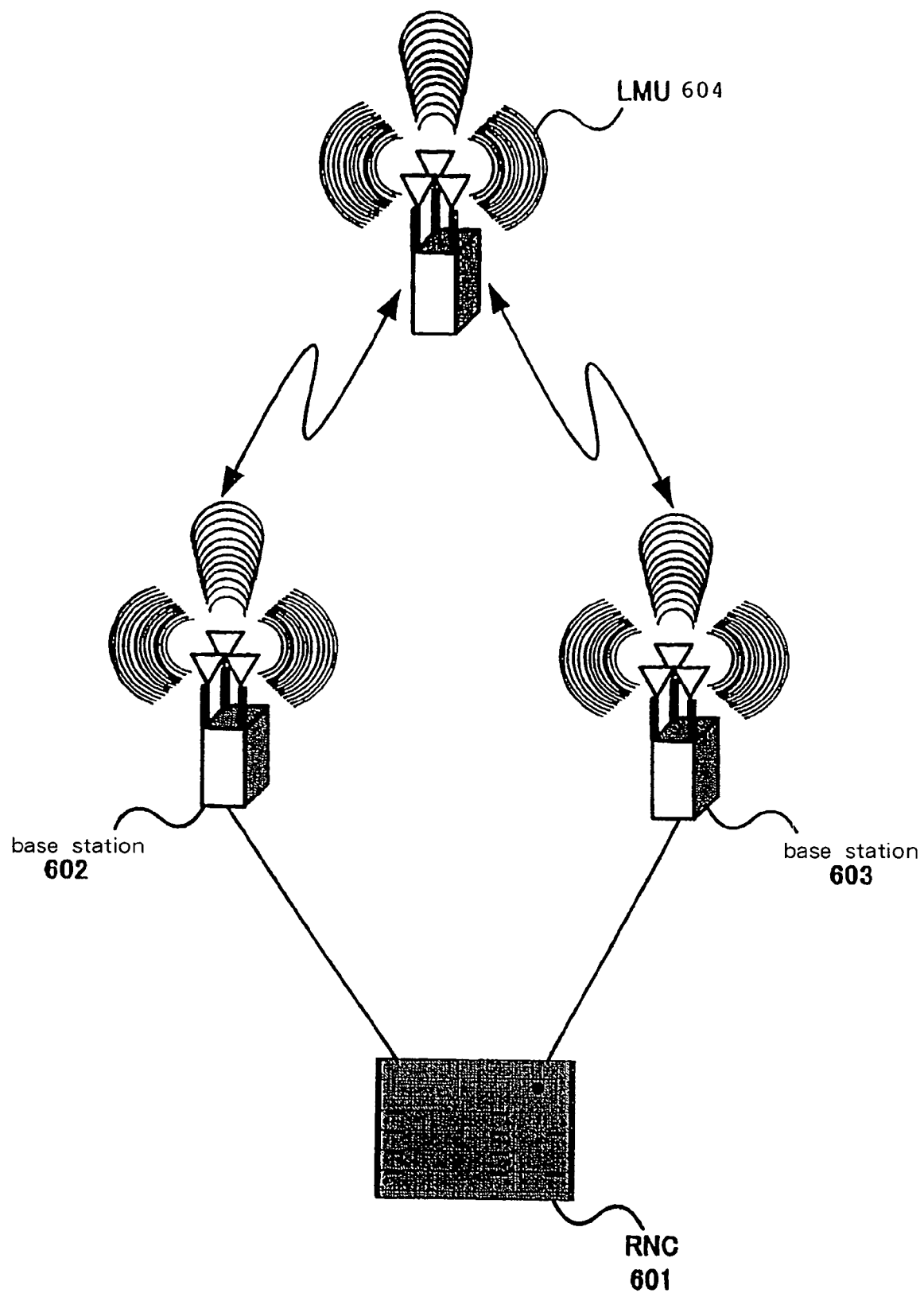
FIG. 5 is a view for explaining another example of a method of calculating RTD that has been established by 3GPP.
Figure 6:
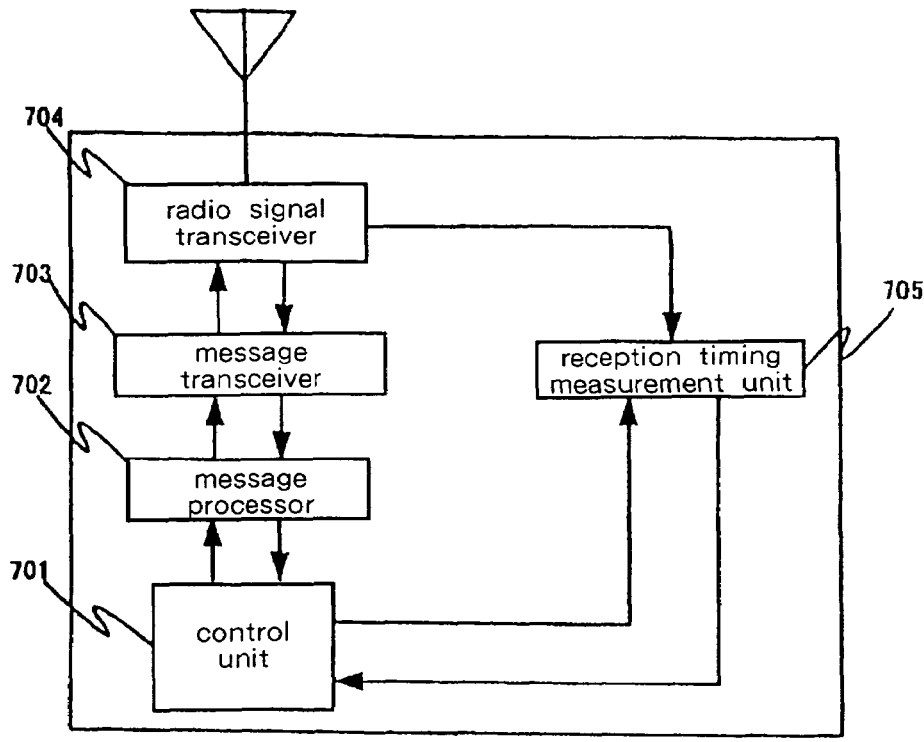
FIG. 6 is a view showing the configuration of LMU 604 shown in FIG. 5.
Figure 7:
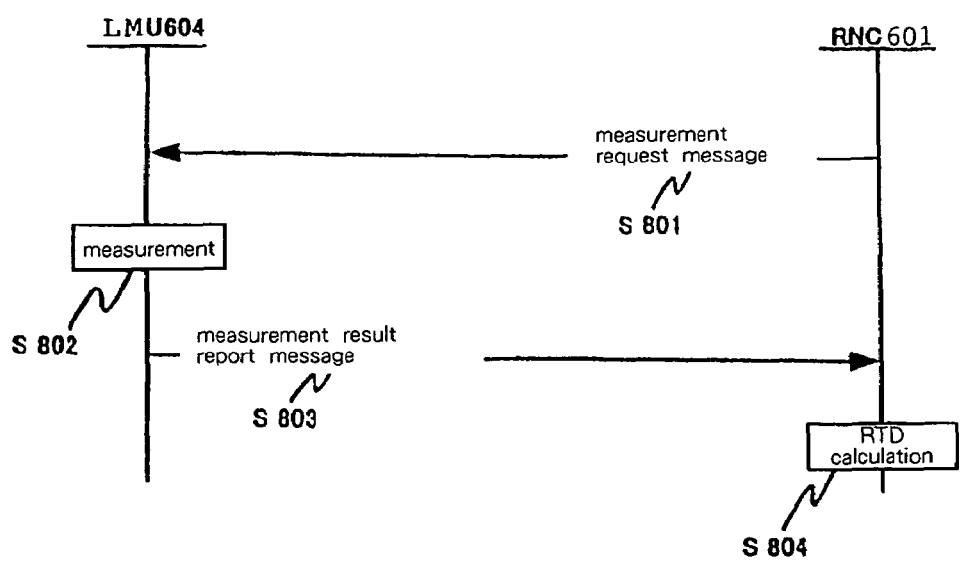
FIG. 7 is a view for explaining the sequence in another example of an RTD calculation method that uses LMU 604.
Figure 8:
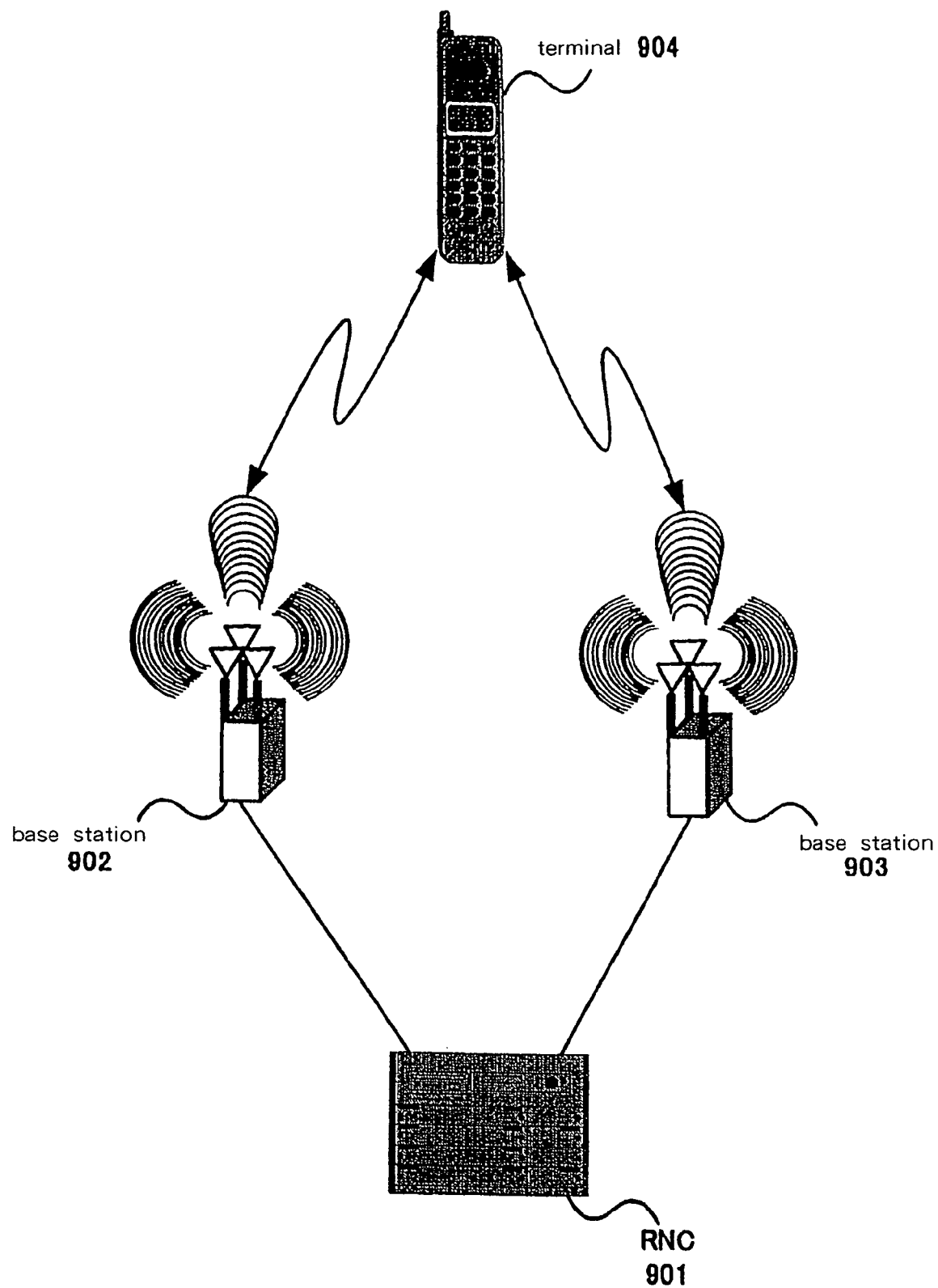
FIG. 8 is a view for explaining soft hand-over.
Figure 9:
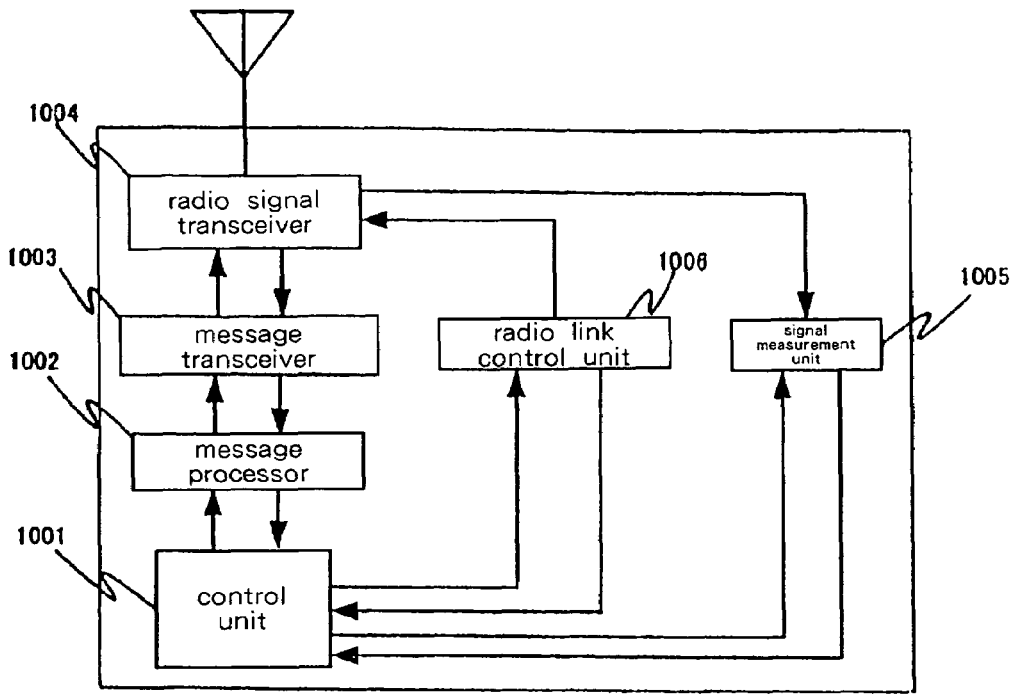
FIG. 9 shows the configuration of terminal 904 shown in FIG. 8.
Figure 10:
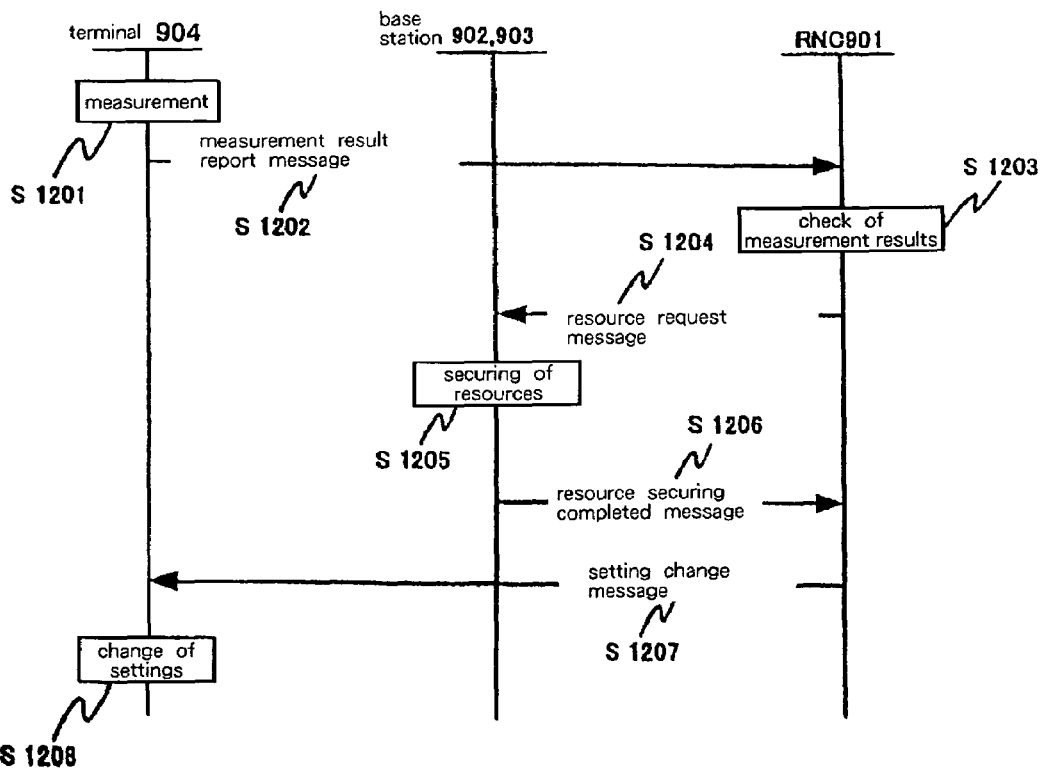
FIG. 10 is a view for explaining the sequence when carrying out soft hand-over.

The configuration of RNC 1301 is identical to the configuration shown in FIG. 2, and explanation is therefore here omitted.

Figure 14:
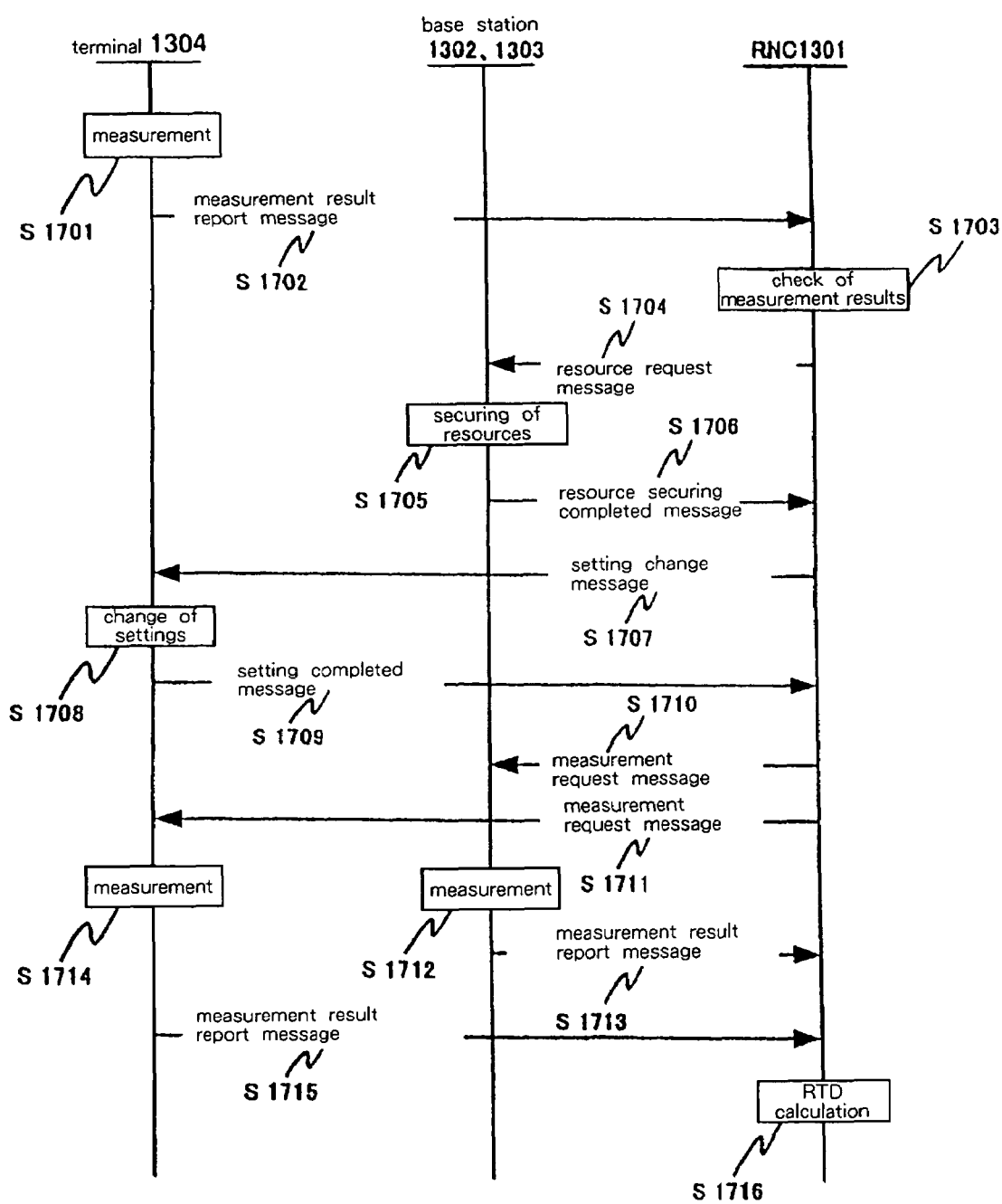
FIG. 14 is a view for explaining the sequence of the transmission time difference measurement method in the first working example of the present invention.

FIG. 14 is a view for explaining the sequence of the transmission time difference measurement method in the first working example of the present invention.

Control unit 1501 of terminal 1304 periodically issues requests for measurement to reception quality measurement unit 1508, and reception quality measurement unit 1508 measures the reception quality of pilot signals from all base stations that are received by radio signal transceiver 1504 (Step 1701). Upon completing measurement, reception quality measurement unit 1508 reports the measurement results to control unit 1501.

Control unit 1501, having been notified of the measurement results from reception quality measurement unit 1508, compares the reported reception quality with a predetermined quality and issues a request to message processor 1502 to transmit a message that reports to RNC 1301 the information of base stations from which pilot signals are received with quality that is equal to or higher than the predetermined quality and the reception quality of the pilot signals that are being received from these base stations. In this case, it is assumed that the reception quality of pilot signals that are received from both of base stations 1302 and 1303 is equal to or greater than the predetermined quality, and the information of base stations 1302 and 1303 and the reception quality of the pilot signals that are received from base stations 1302 and 1303 are therefore reported to RNC 1301.

Message processor 1502, having received the request from control unit 1501, generates a measurement result report message and issues a request to message transceiver 1503 to transmit the generated message. Message transceiver 1503, having received the request from message processor 1502, transmits the measurement result report message to RNC 1301 by way of radio signal transceiver 1504 (Step 1702).

Message transceiver 303 of RNC 1301, having received the measurement result report message from terminal 1304, reports the reception of the message to message processor 302. Upon receiving the report from message transceiver 303, message processor 302 verifies that the received message is a measurement result report message from terminal 1304, and then notifies control unit 301 that a measurement result report message has been received from terminal 1304.

Control unit 301 checks the content of the received message (Step 1703). In this case, the measurement result report message has been received from terminal 1304, and the reported reception quality is therefore compared with the predetermined quality. In this case, it is assumed that the reception quality of pilot signals received from base stations 1302 and 1303 is equal to or greater than the predetermined quality.

Upon recognizing that terminal 1304 is receiving pilot signals from base stations 1302 and 1303 with quality that is equal to or greater than the predetermined quality, control unit 301 begins the soft hand-over process.

Control unit 301 generates a message to message processor 302 for securing radio resources and issues a request to transmit the message to base stations 1302 and 1303. Message processor 302, having received the request from control unit 301, generates a resource securing request message and issues a request to message transceiver 303 to transmit the generated message. Message transceiver 303, having received the request from message processor 302, transmits the message to base stations 1302 and 1303 (Step 1704).

Message transceiver 1403 of each of base stations 1302 and 1303, having received the message from RNC 1301, reports the reception of the message to message processor 1402. Message processor 1402, having received the report, recognizes that the received message is a resource securing request message and then reports the reception of the resource securing request message from RNC 301 to control unit 1401.

Control unit 1401, having received the report from message processor 1402, issues a request to radio signal transceiver 1403 to secure radio resources, and radio signal transceiver 1403, having received the request, secures radio resources (Step 1705). Upon completing securing of radio resources, radio signal transceiver 1403 reports that securing has been completed to control unit 1401.

Control unit 1401, having verified that radio resources have been secured, issues a request to message processor 1402 to transmit a message to RNC 1301 to report that the securing of radio resources has been completed. Upon receiving the request from control unit 1401, message processor 1402 generates a resource securing completed message and issues a request to message transceiver 1403 to transmit the generated message to RNC 1301. Message transceiver 1403, having received the request from message processor 1402, transmits the message to RNC 1301 (Step 1706).

Message transceiver 303 of RNC 1301, having received messages from base stations 1302 and 1303, reports to message processor 302 that messages have been received. Message processor 302, having received the report, verifies that the received messages are resource securing completed messages and then reports to control unit 301 the reception of resource securing completed messages from base stations 1302 and 1303.

Control unit 301, having received the report, verifies that securing of radio resources has been completed and issues a request to message processor 302 to transmit a message to terminal 1304 to change the settings of terminal 1304 to use base stations 1302 and 1303 for communication.

Message processor 302, having received the request, generates a setting change message and issues a request to message transceiver 303 to transmit the generated message. Message transceiver 303 then transmits the setting change message to terminal 1304 (Step 1707).

Message transceiver 1503 of terminal 1304, upon receiving the setting change message by way of radio signal transceiver 1504, reports the reception of the message to message processor 1502. Message processor 1502 verifies that the received message is a setting change message and reports to control unit 1501 that a setting change message has been received as well as the content of the settings changes. In this case, the reported content indicates that settings are to be changed to simultaneously use both of base stations 1302 and 1303 for communication.

Control unit 1501, having received the report, issues a request to radio link control unit 1506 to change settings such that both of base stations 1302 and 1303 are used in the transmission and reception of data and voice signals. Radio link control unit 1506, having received the request, changes the settings of radio signal transceiver 1504 such that base stations 1302 and 1303 can be used for communication (Step 1708). When settings have been changed, control unit 1501 issues a request to message processor 1502 to report to RNC 1301 that the change of settings has been completed.

Message processor 1502, having received the request from control unit 1501, generates a settings completed message and issues a request to message transceiver 1503 to transmit the generated message. Upon receiving the request from message processor 1502, message transceiver 1503 transmits the message to RNC 1301 by way of radio signal transceiver 1504 (Step 1709).

Message transceiver 303 of RNC 1301, having received the settings completed message from terminal 1304, reports the reception of the message to message processor 302. Upon receiving this report, message processor 302 verifies that the message is a settings completed message and then reports to control unit 301 that a settings completed message has been received from terminal 1304.

Control unit 301, having received the report, issues a request to message processor 302 to transmit a message to base stations 1302 and 1303 requesting measurement of RTT with terminal 1304.

Message processor 302, having received the request, generates a measurement request message and issues a request to message transceiver 303 to transmit the generated message to base stations 1302 and 1303. Message transceiver 303 transmits the message requested from message processor 302 to base stations 1302 and 1303 (Step 1710).

At the same time, control unit 301 issues a request to message processor 302 to issue a request to terminal 1304 to measure the arrival time difference of pilot signals that are received from base stations 1302 and 1303 and the turn-around time for receiving signals from base stations 1302 and 1303 until the transmission of signals to base stations 1302 and 1303.

Message processor 302, having received the request, generates a measurement request message and issues a request to message transceiver 303 to transmit the generated message to terminal 1304. Message transceiver 303 transmits the message requested from message processor 302 to terminal 1304 (Step 1711).

Message transceiver 1403 of each of base stations 1302 and 1303 that have received the measurement request message from RNC 1301 reports the reception of the message to message processor 1402. Message processor 1402, having received the report, verifies that the received message is a measurement request message and reports to control unit 1401 that a measurement request message has been received.

Upon receiving the report, control unit 1401 issues a request to radio signal transmission/reception timing measurement unit 1405 to measure the times of transmission of radio signals to terminal 1304 and the times of reception of radio signals from terminal 1304.

Radio signal transmission/reception timing measurement unit 1405 measures the times of transmission of radio signals to terminal 1304 and the times of reception of radio signals from terminal 1304 and reports the measurement results to control unit 1401 (Step 1712).

Control unit 1401, having received the report of the measurement results from radio signal transmission/reception timing measurement unit 1405, finds the difference between the transmission times and reception times of radio signals that have been reported to calculate the RTT. Control unit 1401 then issues a request to message processor 1402 to transmit a message to report the calculated RTT to RNC 1301.

Message processor 1402 generates a measurement result report message and issues a request to message transceiver 1403 to transmit the generated message. Message transceiver 1403 transmits the requested message to RNC 1301 (Step 1713).

Message transceiver 1503 of terminal 1304, having received the measurement request message from RNC 1301 by way of radio signal transceiver 1504, reports the reception of the message to message processor 1502. Message processor 1502, having received the report, verifies that the received message is a measurement request message and reports the reception of a measurement request message to control unit 1501.

Control unit 1501, having received the report, issues a request to reception timing measurement unit 1505 to measure the reception times of pilot signals that are received from base station 1302 and the reception times of pilot signals that are received from base station 1303. At the same time, control unit 1401 issues a request to RTT turn-around time measurement unit 1507 to measure the reception times of receiving radio signals from base station 1302 and 1303 and the times of transmitting radio signal to base stations 1302 and 1303.

Reception timing measurement unit 1505 measures the times of receiving pilot signals that are received from base station 1302 and the times of receiving pilot signals that are received from base station 1303 and reports the measurement results to control unit 1501. In addition, RTT turn-around time measurement unit 1507 measures the reception times of receiving radio signals from base stations 1302 and 1303 and the times of transmitting radio signals to base stations 1302 and 1303 and reports the measurement results to control unit 1501 (Step 1714).

Control unit 1501, having received the reported measurement results from radio signal transmission/reception timing measurement unit 1505, finds the differences between each of the reception times and calculates the arrival time difference of the pilot signals. The arrival time difference is calculated using as a base the arrival times of pilot signals from base station 1302. Upon receiving the reported measurement results from RTT turn-around time measurement unit 1507, control unit 1501 further finds the differences between the reception times and transmission times of radio signals for each of base stations 1302 and 1303 and calculates the time expended for the turn-around of the radio signals.

Control unit 1501 issues a request to message processor 1502 to transmit a message to report to RNC 1:301 the arrival time difference of pilot signals that are received from base stations 1302 and 1303 and the time required for turn-around of radio signals to each of base stations 1302 and 1303.

Message processor 1502, having received the request from control unit 1501, generates a measurement result report message and issues a request to message transceiver 1503 to transmit the generated message. Message transceiver 1503 transmits the requested message to RNC 1301 by way of radio signal transceiver 1504 (Step 1715).

Message transceiver 303 of RNC 1301 that has received the measurement result report messages from base stations 1302 and 1303 and terminal 1304, reports the reception of the messages to message processor 302. Message processor 302 verifies that the received messages are measurement result report messages and then reports to control unit 301 that measurement result report messages have been received from base station 1302, base station 1303, and terminal 1304.

Control unit 301 calculates the RTD based on the measurement results that have been reported from each of base stations 1302 and 1303 and terminal 1304 (Step 1716).

Figure 15:
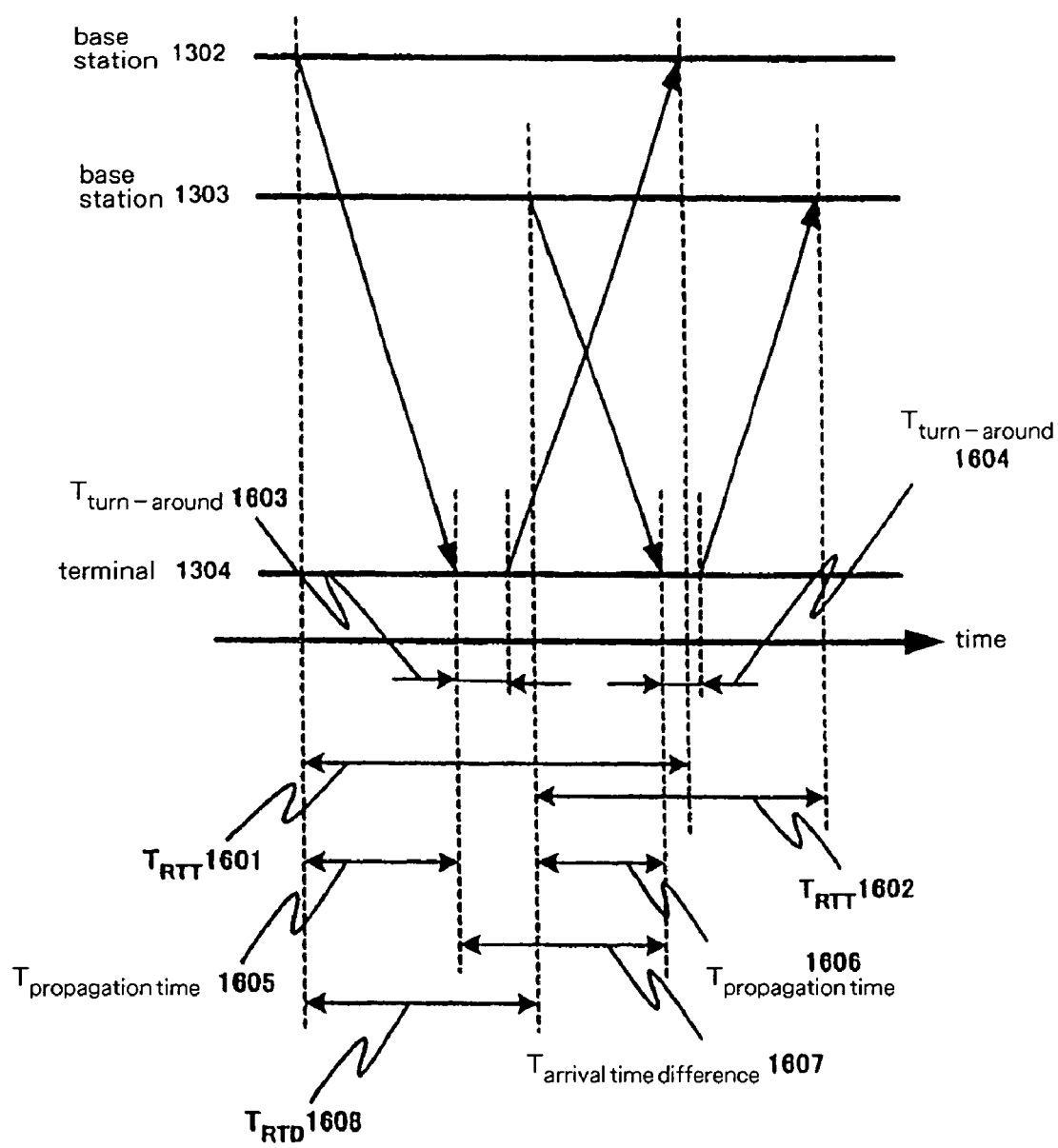
FIG. 15 is a view showing the fundamentals for RTD calculation in the first working example of the present invention.

FIG. 15 shows the fundamentals when control unit 301 calculates RTD from the measurement results that have been reported from each of base station 1302, base station 1303, and terminal 1304 in Step 1716 of FIG. 14.

If $T_{RTT}$1601 is the RTT with terminal 1304 that is measured at base station 1302, $T_{turn-around}$1603 is the turn-around time for communication with base station 1302 that is measured at terminal 1304, and the time of propagation of radio waves through space is represented by $(T_{RTT}$1601$-T_{turn-around}$1603$)$, then $T_{propagation\ time}$1605, which is the time for a signal transmitted from base station 1302 to be received at terminal 1304, is represented by the following equation:

$$T_{propagation\ time}1605 = (T_{RTT}1601 - T_{turn-around}1603)/2$$

Similarly, if $T_{RTT}$1602 is the RTT with terminal 1304 that is measured at base station 1303, and $T_{turn-around}$1604 is the turn-around time for communication with base station 1303 that is measured at terminal 1304, then $T_{propagation\ time}$1606, which is the time for a signal that is transmitted from base station 1303 to be received at terminal 1304, is represented by the following equation:

$$T_{propagation\ time}1606 = (T_{RTT}1602 - T_{turn-around}1604)/2$$

Here, if $T_{RTD}$1608, which is the transmission time difference between base station 1302 and base station 1303, is defined as the delay in the transmission time of base station 1302 with respect to the transmission time of pilot signals of base station 1303 that is closer to terminal 1304, then, using $T_{propagation\ time}$1605, $T_{propagation\ time}$1606, and $T_{arrival\ time\ difference}$1607, which is the arrival time difference of pilot signals from base stations 1302 and 1303 that is measured at terminal 1304, $T_{RTD}$1608 is represented by the following equation:

$$T_{RTD}1608 = T_{propagation\ time}1605 - T_{propagation\ time}1606 + T_{arrival\ time\ difference}1607$$

Control unit 301, which has calculated the RTD between base station 1302 and base station 1303 as shown above, stores the calculated result in memory 304. At the same time, control unit 301 further stores information for specifying terminal 1304 that has performed measurement at this time as well as the time of calculation of the RTD.

SECOND WORKING EXAMPLE

In the first working example, the terminal that carried out soft hand-over by necessity also performed the measurements that were required for calculating RTD, but a method may also be considered in which the necessary measurements are carried out by only specific terminals and not all terminals that carry out soft hand-over. This method will be referred to as the second working example and is explained below with reference to FIG. 16.

Figure 16:
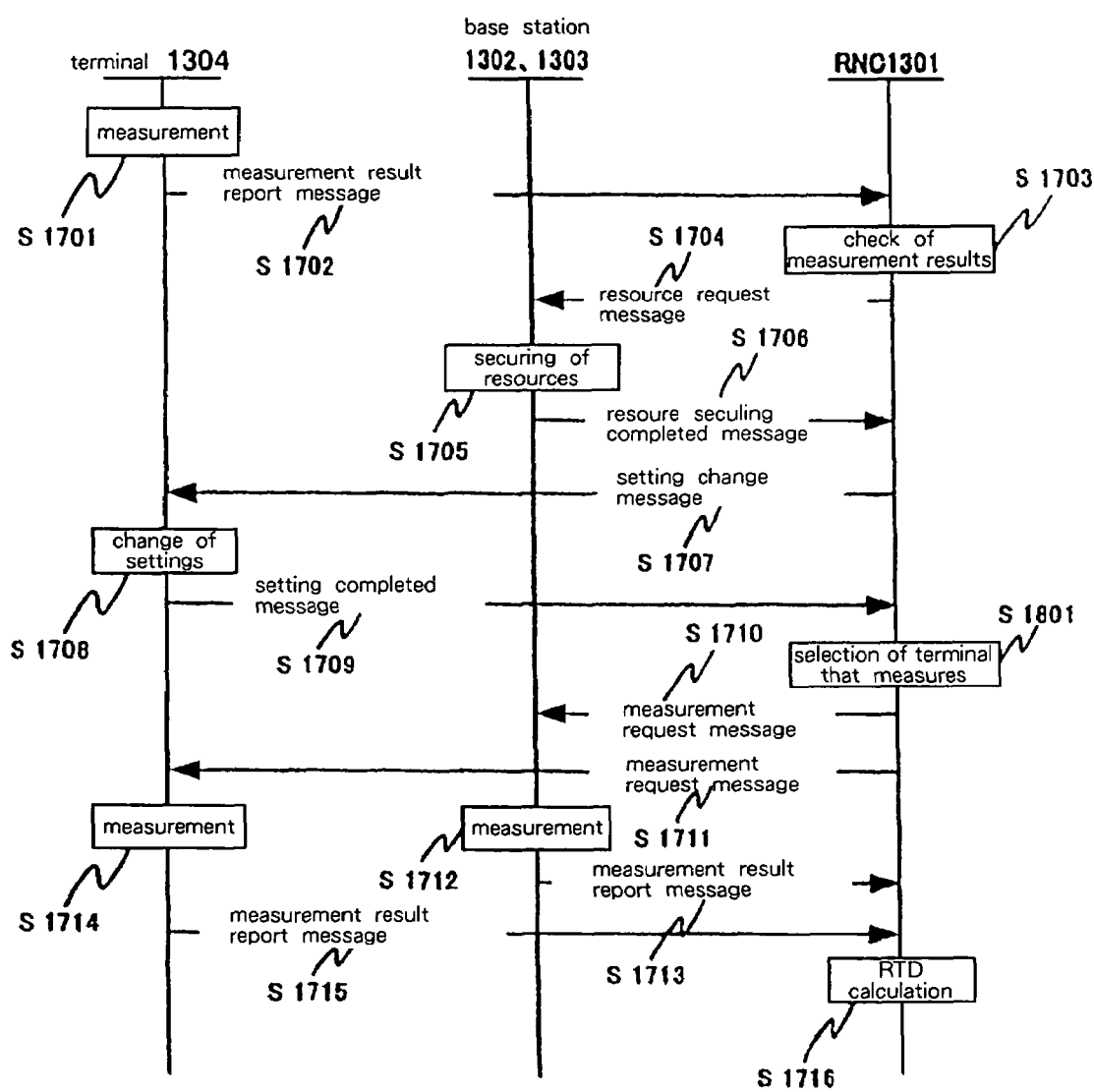
FIG. 16 is a view for explaining the sequence of the transmission time difference measurement method in the second to eighth working examples of the present invention.

FIG. 16 is a view for explaining the sequence of the transmission time difference measurement method in the second working example of the present invention. The sequence from Step 1701 to Step 1709 is identical to that of the first working example, and explanation is therefore here omitted. In addition, in the present working example, information indicating the functions of terminal 1304, specifically, the physical capacity and measurement accuracy that can be attained by terminal 1304, are stored in memory 304 of RNC 1301. Explanation relating to the method of storing the information that indicates the capabilities of terminal 1304 in memory 304 of RNC 1301 is omitted in the present working example.

The following explanation relates to the process of RNC 1301 in Step 1801 that is carried out after completion of the sequence of Step 1701 to Step 1709.

In Step 1801, upon verifying the completion of settings changes in terminal 1304, control unit 301 of RNC 1301 refers to the capabilities possessed by terminal 1304 that are stored in memory 304.

When terminal 1304 has the capability for measurement at accuracy that equals or exceeds a predetermined value, the sequence is executed starting from Step 1710. On the other hand, if terminal 1304 does not possess the capability for measurement of the arrival time difference of pilot signals at accuracy that equals or exceeds a predetermined value, the process ends without executing the sequence that starts from Step 1710.

THIRD WORKING EXAMPLE

In the second working example of the present invention, explanation regarded a method for selecting a terminal that carries out measurements using as a standard the capabilities possessed by the terminal, but a method may also be considered in which a terminal is selected based on the number of measurements that are carried out within a fixed time interval. This method will be described as the third working example while referring to FIG. 16. The sequence of Steps 1701 to 1709 is identical to the first working example, and explanation regarding these steps is therefore here omitted.

In Step 1801, upon verifying the completion of the changes of settings in terminal 1304, control unit 301 of RNC 1301 refers to RTD information that is stored in memory 304 and acquires the number of measurements for the RTD calculation that are carried out by terminal 1304 within a predetermined time interval.

If the number of measurements that terminal 1304 carries out within a predetermined time interval does not attain a predetermined number of measurements, the sequence that starts from Step 1710 is executed. On the other hand, if the number of measurements carried out by terminal 1304 equals or exceeds the predetermined number, the process ends without executing the sequence that starts from Step 1710.

Conversely, the sequence that starts from Step 1710 may be executed if the number of measurements is equal to or greater than the predetermined number, and the process may end without executing the sequence that starts from Step 1710 if the number of measurements is less than the predetermined number.

The method of determining the time interval for counting the number of measurements may assume various forms, including a method in which this time interval is the time from the completion of charging until next charging.

FOURTH WORKING EXAMPLE

In the third working example of the present invention, explanation regarded a method in which measurements are not carried out when the number of measurements executed by the terminal within a fixed time interval is less than or equal to or greater than a predetermined number, but a method may also be considered in which the terminal that carries out measurements is selected according to the reception quality of signals from base stations in the terminal that carries out measurements. This method is described below as the fourth working example while referring to FIG. 16. The sequence of Steps 1701 to 1709 is identical to the first working example, and explanation is therefore here omitted.

In Step 1801, upon verifying that settings changes in terminal 1304 have been completed, control unit 301 of RNC 1301 checks the reception quality of pilot signals that are reported from terminal 1304 in Step 1703.

When the reception quality of pilot signals reported from terminal 1304 is less than a predetermined quality, the process ends without executing the sequence that starts from Step 1710. On the other hand, if the reception quality of pilot signals reported from terminal 1304 is equal to or better than the predetermined quality, the sequence that starts from Step 1710 is executed.

FIFTH WORKING EXAMPLE

In the third and fourth working examples of the present invention, explanation regarded a method of selecting the terminal that carries out measurements according to the capabilities of the terminal, the number of measurements of the terminal, and the reception quality, respectively, but a method can also be considered in which measurements are not carried out when the RTD has already been calculated. Such a method is described below as the fifth working example with reference to FIG. 16. The sequence of Steps 1701 to 1709 is identical to the first working example, and explanation is therefore here omitted.

In Step 1801, control unit 301 of RNC 1301, upon verifying that settings changes in terminal 1304 have been completed, refers to the RTD information that is stored in memory 304 and checks whether the results of calculating the RTD of base stations 1302 and 1303 have been stored or not.

If memory 304 does not store the calculation results of the RTD of base stations 1302 and 1303, the sequence that starts from Step 1710 is executed. On the other hand, if memory 304 stores the calculation results of the RTD of base stations 1302 and 1303, the process ends without executing the sequence that starts from Step 1710.

A method can also be considered in which the time at which the RTD was calculated is also used together with the RTD. In such a case, upon verifying that settings changes in terminal 1304 have been completed in Step 1801, control unit 301 of RNC 1301 refers to the RTD information that is stored in memory 304 and checks whether the RTD calculation results of base stations 1302 and 1303 have been stored.

If memory 304 does not store the RTD calculation results of base stations 1302 and 1303, the sequence that starts from Step 1710 is executed, but if memory 304 does store the RTD calculation results of base stations 1302 and 1303, control unit 301 refers to the time of calculation of the RTD that is stored in memory 304. If the difference between the current time and the time of calculation is equal to or greater than a predetermined time interval, the sequence that starts from Step 1710 is executed, but if the time interval does not attain the predetermined time interval, the process ends without executing the sequence that starts from Step 1710.

SIXTH WORKING EXAMPLE

In the second and third working examples of the present invention, methods were described in which the terminal that carries out measurement is selected according to the capability of the terminal or the number of measurements of the terminal, but a method can also be considered in which the terminal that carries out measurement is selected by combining the two approaches. Such a method is described below as the sixth working example with reference to FIG. 16. The sequence from Step 1701 to Step 1709 is identical to the first working example, and explanation is therefore here omitted.

In Step 1801, upon verifying that settings changes in terminal 1304 have been completed, control unit 301 of RNC 1301 refers to the capabilities of terminal 1304 that are stored in memory 304 and to number of measurements that have been carried out by terminal 1304 in a fixed time interval.

The sequence that starts from Step 1710 is executed if certain conditions are met, i.e., if terminal 1304 has the capability to measure at an accuracy that equals or exceeds a predetermined value and carries out a number of measurements that does not equal or exceed a predetermined number within a predetermined fixed time interval. On the other hand, the process ends without executing the sequence that starts from Step 1710 if the above-described conditions are not satisfied.

A method can also be considered in which the second and fourth working examples are combined. In this case, according to one possible example of the conditions by which control unit 301 selects terminal 1304 as the terminal that carries out measurements in Step 1801, terminal 1304 has the capability to carry out measurements at an accuracy that equals or exceeds a predetermined value, and moreover, receives pilot signals from base stations 1302 and 1303 at a reception quality that equals or exceeds a predetermined quality.

Alternatively, a method can be considered in which the second and fifth working examples of the present invention are combined. In this case, according to one possible example of the conditions by which control unit 301 selects terminal 1304 as the terminal that carries out measurements in Step 1801, terminal 1304 has the capability to carry out measurements at an accuracy that equals or exceeds a predetermined value, and moreover, the RTD of base stations 1302 and 1303 have not been stored in memory 304. As an alternative condition that can be considered, terminal 1304 has the capability to carry out measurements at an accuracy that equals or exceeds a predetermined value, and moreover, the RTD of base stations 1302 and 1303 have not been stored in memory 304, or the difference between the current time and the time of calculation of the RTD that is stored equals or exceeds a predetermined time interval.

A method can also be considered in which the third and fourth working examples of the present invention are combined. In this case, according to one example of the conditions by which control unit 301 selects terminal 1304 as the terminal that carries out measurements in Step 1801, terminal 1304 carries out a number of measurements that does not equal or exceed a predetermined number within a predetermined time interval, and moreover, terminal 1304 receives pilot signals from base stations 1302 and 1303 at a reception quality that equals or exceeds a predetermined quality.

Still further, a method can also be considered in which the third and fifth working examples of the present invention are combined. In this case, according to one example of the conditions by which control unit 301 selects terminal 1304 as the terminal that carries out measurements in Step 1801, terminal 1304 carries out a number of measurements that does not equal or exceed a predetermined number within a predetermined fixed time interval, and moreover, the RTD of base stations 1302 and 1303 have not been stored in memory 304. Alternatively, according to one possible example of the conditions, terminal 1304 carries out a number of measurements that does not equal or exceed a predetermined number within a predetermined fixed time interval, and moreover, the RTD of base stations 1302 and 1303 have not been stored in memory 304, or the difference between the current time and the time of calculation of the RTD that have been stored in memory 304 equals or exceeds a predetermined time interval.

A method can also be considered in which terminal 1304 is selected as the terminal that carries out measurements even when terminal 1304 carries out a number of measurements that equals or exceeds a predetermined number within a predetermined fixed time interval, if the RTD of base stations 1302 and 1303 have not been stored in memory 304. Alternatively, a method can be considered in which terminal 1304 is selected as the terminal that carries out measurements even when terminal 1304 carries out a number of measurements that equals or exceeds a predetermined number within a predetermined fixed time interval if the RTD of base stations 1302 and 1303 have not been stored in memory 304 or if the difference between the current time and the time of calculation of the RTD that have been stored in memory 304 equals or exceeds a predetermined time interval.

Still further, a method can be considered in which the fourth and fifth working examples of the present invention are combined. In this case, according to one example of the conditions by which control unit 301 selects terminal 1304 as the terminal that carries out measurements in Step 1801, terminal 1304 receives pilot signals from base stations 1302 and 1303 at a reception quality that equals or exceeds a predetermined quality, and moreover, the RTD of base stations 1302 and 1303 have not stored in memory 304. Alternatively, according to an example of conditions that can be considered, terminal 1304 receives pilot signals from base stations 1302 and 1303 at a reception quality that equals or exceeds a predetermined quality, and moreover, the RTD of base station 1302 and 1303 have not been stored in memory 304, or the difference between the current time and the time of calculation of the RTD that have been stored in memory 304 equals or exceeds a predetermined time interval.

SEVENTH WORKING EXAMPLE

A method can also be considered in which the terminal that carries out measurements is selected by combining the second, third, and fourth working examples of the present invention. This method is described below as the seventh working example with reference to FIG. 16. The sequence of Steps 1701 to 1709 is identical to the first working example, and explanation of this sequence is therefore here omitted.

In Step 1801, when control unit 301 of RNC 1301 verifies that settings changes have been completed in terminal 1304, control unit 301 refers to the capabilities of terminal 1304 that are stored in memory 304 and the number of measurements that terminal 1304 carries out within a predetermined fixed time interval. In addition, control unit 301 refers to the reception quality of pilot signals from base stations 1302 and 1303 in terminal 1304.

The sequence from Step 1710 is executed if the following conditions are met: terminal 1304 has the capability to carry out measurement at an accuracy that equals or exceeds a predetermined value; terminal 1304 carries out a number of measurements that does not equal or exceed a predetermined number within a predetermined fixed time interval; and the reported reception quality equals or exceeds a predetermined quality. If the above-described conditions are not satisfied, the process ends without executing the sequence that begins from Step 1710.

A method for selecting the terminal that carries out measurements can also be considered in which the second, third, and fifth working examples of the present invention are combined. In this case, as an example that can be considered for the conditions by which control unit 301 selects terminal 1304 as the terminal that carries out measurements in Step 1801: terminal 1304 has the capability to carry out measurement at an accuracy that equals or exceeds a predetermined value, terminal 1304 carries out a number of measurements that does not equal or exceed a predetermined number within a predetermined fixed time interval, and the RTD of base stations 1302 and 1303 have not been stored in memory 304. Alternatively, according to conditions that can be considered: terminal 1304 has the capability to carry out measurement at an accuracy that equals or exceeds a predetermined value, terminal 1304 carries out a number of measurements that does not equal or exceed a predetermined number within a predetermined fixed time interval, and the RTD of base stations 1302 and 1303 have not been stored in memory 304, or the difference between the current time and the time of calculation of the RTD that have been stored in memory 304 equals or exceeds a predetermined time interval.

Still further, a method for selecting the terminal that carries out measurements can be considered in which the second, fourth, and fifth working examples of the present invention are combined. In this case, as an example that can be considered for the conditions by which control unit 301 selects terminal 1304 as the terminal that carries out measurements: terminal 1304 has the capability to carry out measurements at an accuracy that equals or exceeds a predetermined value; the reported reception quality equals or exceeds a predetermined quality; and the RTD of base stations 1302 and 1303 have not been stored in memory 304. Alternatively, as another set of conditions that can be considered: terminal 1304 has the capability to carry out measurement at an accuracy that equals or exceeds a predetermined value; the reported reception quality equals or exceeds a predetermined quality; and the RTD of base stations 1302 and 1303 have not been stored in memory 304, or the difference between the current time and the time of calculation of RTD that have been stored in memory 304 equals or exceeds a predetermined time interval.

Still further, a method for selecting the terminal that carries out measurements can be considered in which the third, fourth, and fifth working examples of the present invention are combined. In this case, as an example that can be considered for the conditions by which control unit 301 selects terminal 1304 as the terminal that carries out measurements in Step 1801: terminal 1304 carries out a number of measurements that does not equal or exceed a predetermined number within a predetermined fixed time interval; the reported reception quality equals or exceeds a predetermined quality; and the RTD of base stations 1302 and 1303 have not been stored in memory 304. Alternatively, as another set of conditions that can be considered: terminal 1304 carries out a number of measurements that does not exceed a predetermined number within a predetermined fixed time interval; the reported reception quality equals or exceeds a predetermined quality; and the RTD of base stations 1302 and 1303 have not been stored in memory 304, or the difference between the current time and the time of calculation of the RTD that have been stored in memory 304 equals or exceeds a predetermined time interval.

EIGHTH WORKING EXAMPLE

A method of selecting the terminal that carries out measurements can also be considered in which the second, third, fourth and fifth working examples of the present invention are combined. This method is described below as the eighth working example with reference to FIG. 16. The sequence of Steps 1701 to 1709 is identical to the first working example, and explanation of this sequence is therefore here omitted.

In Step 1801, upon verifying that settings changes have been completed in terminal 1304, control unit 301 of RNC 1301 refers to the capabilities of terminal 1304 that are stored in memory 304 and the number of measurements that terminal 1304 carries out within a predetermined fixed time interval. Control unit 301 further refers to the reception quality of pilot signals from base stations 1302 and 1303 in terminal 1304. Control unit 301 further checks whether the values of RTD of base stations 1302 and 1303 are stored in memory 304.

The sequence that begins from Step 1710 is executed if the following conditions are satisfied: terminal 1304 has the capability for measurement at an accuracy that equals or exceeds a predetermined value; the number of measurements does not equal or exceed a predetermined number within a predetermined fixed time interval; the reported reception quality equals or exceeds a predetermined quality, and values of RTD of base stations 1302 and 1303 have not been stored in memory 304. If the above-described conditions are not satisfied, the process ends without executing the sequence that begins from Step 1710.

Alternatively, the sequence from Step 1710 is executed if the following conditions are satisfied: terminal 1304 has the capability for carrying out measurement at an accuracy that equals or exceeds a predetermined accuracy; the number of measurements does not equal or exceed a predetermined number within a predetermined fixed time interval; the reported reception quality equals or exceeds a predetermined quality; and the values of RTD of base stations 1302 and 1303 have not been stored in memory 304, or the difference between the current time and the time of calculation of RTD of base stations 1302 and 1303 that have been stored in memory 304 equals or exceeds a predetermined time interval. On the other hand, the process ends without executing the sequence that begins with Step 1710 if the above-described conditions are not met.

NINTH WORKING EXAMPLE

When a plurality of terminals carry out measurements for calculating RTD with the same set of base stations, a method can be considered for raising the accuracy of RTD by calculating the average value of RTD that is calculated from the plurality of measurement results. This method is described as the ninth working example with reference to FIG. 17.

Figure 17:
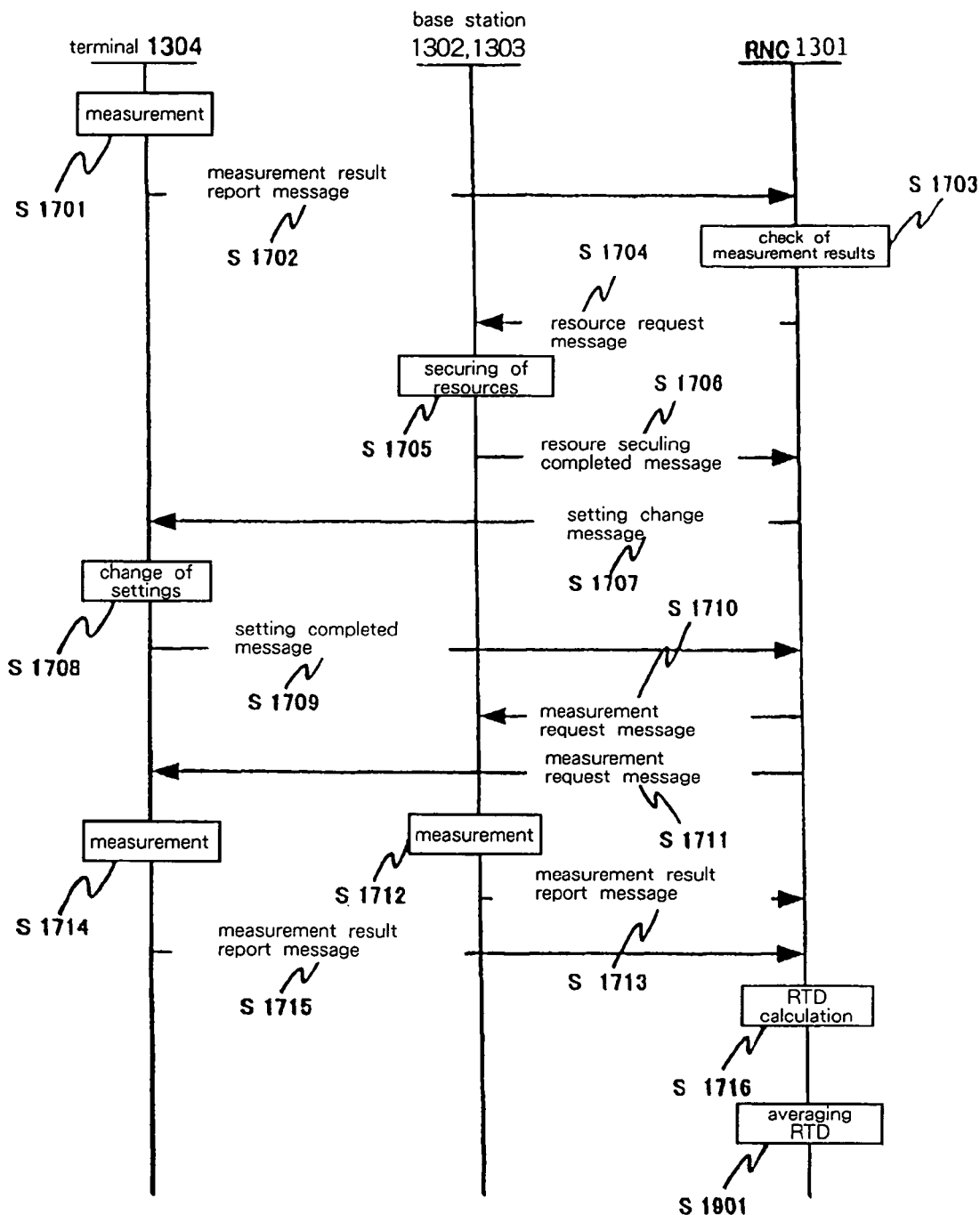
FIG. 17 is a view for explaining the sequence of the transmission time difference measurement method in the ninth working example of the present invention.

FIG. 17 is a view for explaining the sequence of the transmission time difference measurement method in the ninth working example of the present invention. The sequence of Steps 1701 to 1716 is the same as the first working example and explanation of this sequence is therefore here omitted.

The following explanation regards the process of RNC 1301 in Step 1901 that is carried out after completion of the sequence of Step 1701 to Step 1716.

In Step 1901, control unit 301 of RNC 1301, upon calculating the RTD among base stations 1302 and 1303 in Step 1716, refers to memory 304 to check whether RTD among base stations 1302 and 1303 have been stored.

If RTD among base stations 1302 and 1303 have not been stored in memory 304, control unit 301 stores the calculated RTD in memory 304 and ends the process. At this time, control unit 301 simultaneously stores in memory 304 information for specifying terminal 1304 that has carried out the measurements and the time of calculation of the RTD.

On the other hand, if the RTD among base stations 1302 and 1303 have been stored in memory 304, control unit 301 refers to the time of calculation of the stored RTD, and if the difference with the current time is less than a predetermined value, calculates the average of the values of the stored RTD and the values of the RTD that have been calculated this time, and stores the calculation results as the RTD among base stations 1302 and 1303 in memory 304. However, if the difference with the current time equals or exceeds the predetermined value, control unit 301 discards the stored values and stores in memory 304 the values of RTD that have been calculated this time as the RTD among base stations 1302 and 1303.

TENTH WORKING EXAMPLE

When the terminal incorporates a GPS receiver and can specify its own location, a method can be considered for using the specified location to calculate the RTD. This method is described below as the tenth working example.

Figure 18:
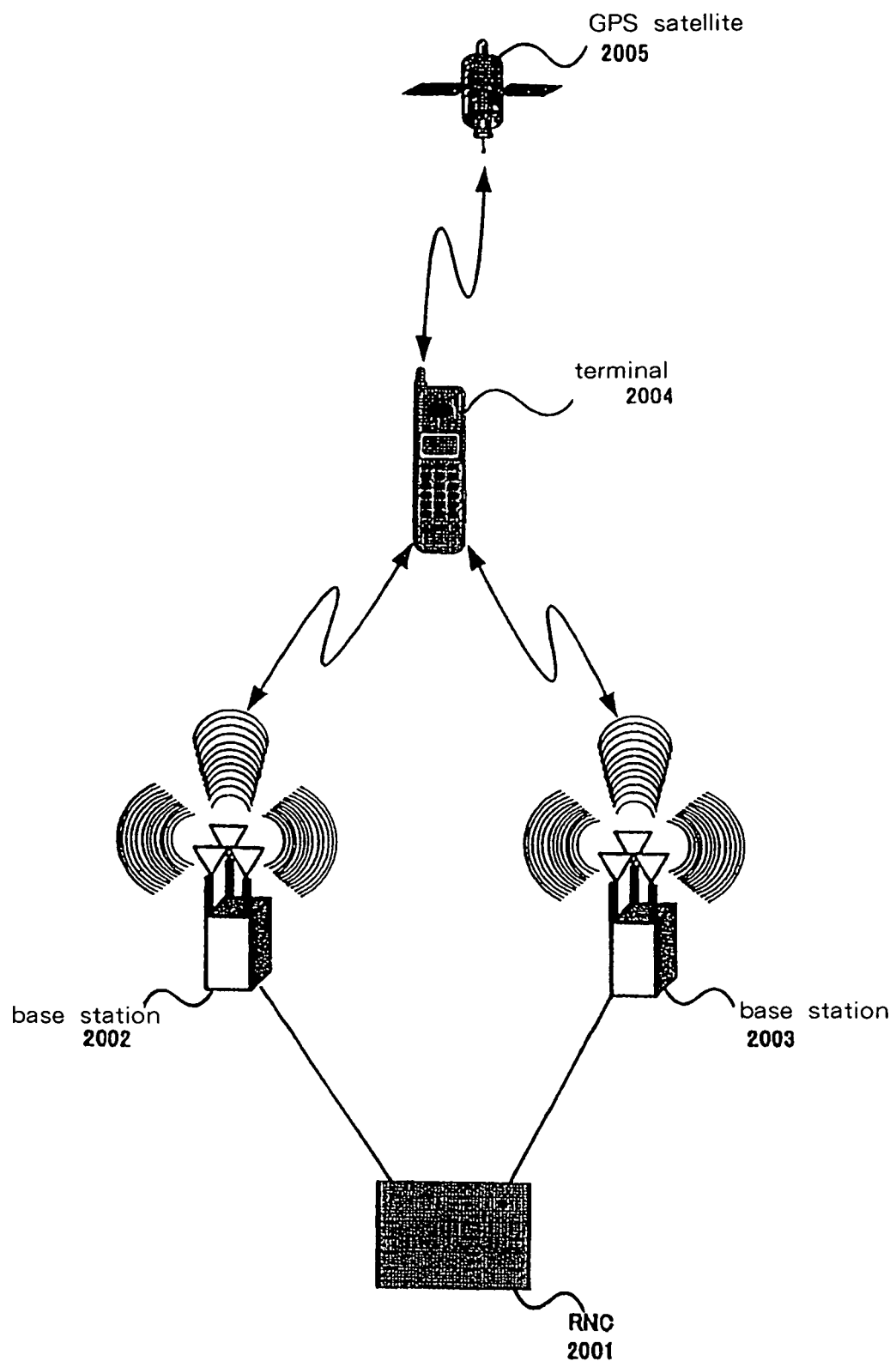
FIG. 18 shows the configuration of the transmission time difference measurement system in the tenth working example of the present invention.

FIG. 18 shows the configuration of the transmission time difference measurement system in the tenth working example of the present invention.

The transmission time difference measurement system that is shown in FIG. 18 is made up from: RNC 2001, base stations 2002 and 2003, terminal 2004, and GPS satellite 2005.

Terminal 2004 uses signals that are received from GPS satellite 2005 to specify its own location. In addition, terminal 2004 measures the arrival time difference of pilot signals that are received from base stations 2002 and 2003 in accordance with requests from RNC 2001.

Base stations 2002 and 2003 transmit pilot signals.

RNC 2001 has the capabilities for controlling the entire measurement sequence that is required for calculating RTD and for calculating RTD from the measurement results.

Figure 19:
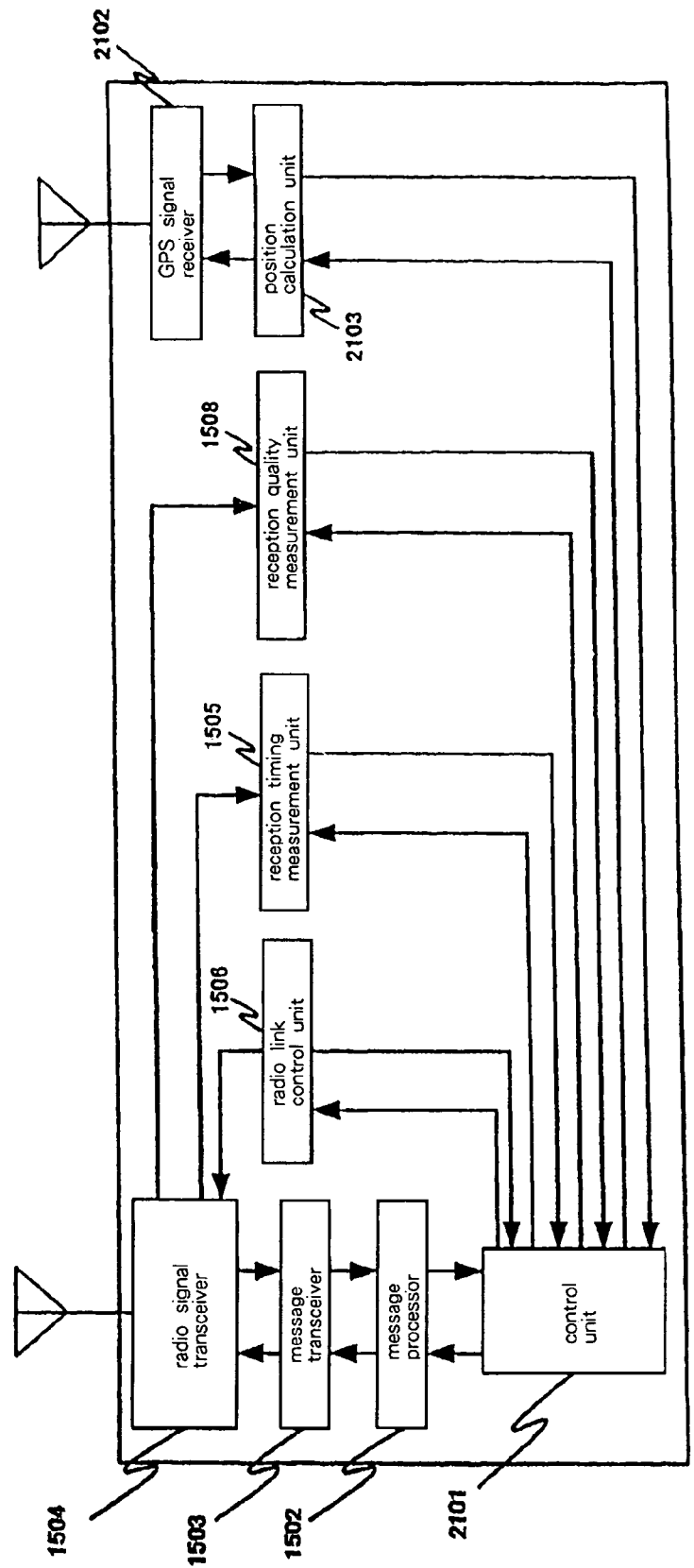
FIG. 19 shows the configuration of terminal 2004 shown in FIG. 18.

FIG. 19 shows the configuration of terminal 2004. This FIG. 19 shows only those portions that are necessary to the explanation.

Terminal 2004 shown in FIG. 19 is made up from: control unit 2101, GPS signal receiver 2102, position calculation unit 2103, message processor 1502, message transceiver 1503, radio signal transceiver 1504, reception timing measurement unit 1505; radio link control unit 1506, and reception quality measurement unit 1508. Message processor 1502, message transceiver 1503, radio signal transceiver 1504, reception timing measurement unit 1505, radio link control unit 1506, and reception quality measurement unit 1508 are of the same configuration as terminal 1304 in the first working example, and explanation of these components is therefore here omitted.

In accordance with the content of messages reported from message processor 1502, control unit 2101 controls the operations of radio link control unit 1506, reception timing measurement unit 1505, reception quality measurement unit 1508, and position calculation unit 2103. Control unit 2101 further issues requests to message processor 1502 to report to RNC 2001 measurement results that are reported from each of radio link control unit 1506, reception timing measurement unit 1505, reception quality measurement unit 1508, and position calculation unit 2103.

The configuration of RNC 2001 is identical to that of the first working example and explanation is therefore here omitted. However, memory 304 stores information relating to the geographical locations of base stations 2002 and 2003.

The configuration of base stations 2002 and 2003 is identical to that of the first working example, and explanation is therefore here omitted.

Figure 20:
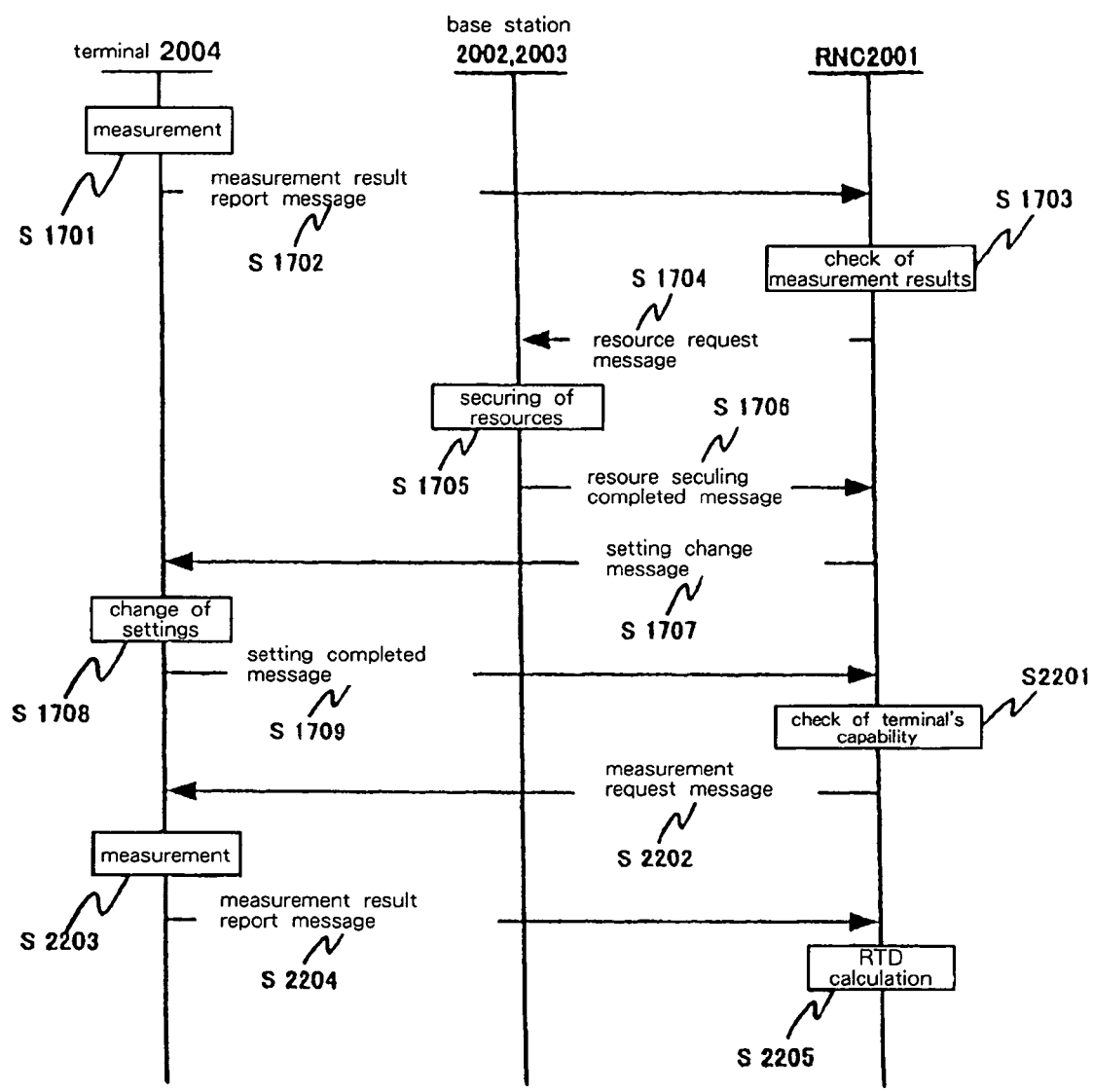
FIG. 20 is a view for explaining the sequence of the transmission time difference measurement method in the tenth working example of the present invention.

FIG. 20 is a view for explaining the sequence of the transmission time difference measurement method in the tenth working example of the present invention. The sequence of Step 1701 to Step 1709 is identical to that of the first working example, and explanation is therefore here omitted.

Control unit 301 of RNC 2001, upon verifying that settings changes of terminal 2004 have been completed, checks whether terminal 2004 has the capability to use GPS positioning to specify its own location (Step 2201). If terminal 2004 lacks this capability, control unit 301 ends the process.

Terminal 2004 has the capability to use GPS positioning to specify its own location, and control unit 301 therefore issues a request to message processor 302 to transmit a message to terminal 2004 to specify its own location and to measure the arrival time difference of pilot signals that are received from base stations 2002 and 2003.

Message processor 302 generates a measurement request message and issues a request to message transceiver 303 to transmit the generated message. Message transceiver 303 transmits the requested message to terminal 2004 (Step 2202).

Message transceiver 1503, having received the message by way of radio signal transceiver 1504, reports the reception of the message to message processor 1502. Message processor 1502 verifies that the received message is a measurement request and reports to control unit 2101 that a measurement request message has been received from RNC 2001.

Control unit 2101 checks the report content from message processor 1502 and verifies that a request has been received to use GPS positioning to specify its own location and to measure the arrival time difference of pilot signals that are received from base stations 2002 and 2003. Control unit 2101, having checked the request content, issues a request to position calculation unit 2103 to use GPS positioning to specify its own location. Control unit 2101 simultaneously issues a request to reception timing measurement unit 1505 to measure the times of receiving pilot signals from base stations 2002 and 2003.

Position calculation unit 2103 uses the signal from the GPS satellite that is received by GPS signal receiver 2102 to specify its own location. When the location has been specified, position calculation unit 2103 reports the geographical location that has been specified to control unit 2101 (Step 2203).

Reception timing measurement unit 1505 measures the reception times of pilot signals that are received from base stations 2002 and 2003 as requested and reports the measurement results to control unit 2101 (Step 2203).

Control unit 2101, having been notified of the measurement results from reception timing measurement unit 1505, calculates the difference in reception times that have been measured and finds the arrival time difference of the pilot signals that are received from base stations 2002 and 2003.

Control unit 2101 issues a request to message processor 1502 to report to RNC 2001 the calculated arrival time difference and the its own geographical location that was reported from position calculation unit 2103.

Message processor 1502 generates a measurement result report message and issues a request to message transceiver 1503 to transmit the generated message. Message transceiver 1503 transmits the message for which transmission has been requested to RNC 2001 by way of radio signal transceiver 1504 (Step 2204).

Message receiver 303 of RNC 2001 that has received the measurement result report message from terminal 2004 reports the reception of the message to message processor 302. Message processor 302 verifies that the received message is a measurement result report message and reports to control unit 301 that a measurement result report message has been received from terminal 2004.

In control unit 301, the content of the measurement result report message is checked, and the following processes (1)-(7) are executed (Step 2205):

(1) The geographical locations of base stations 2002 and 2003 are acquired from memory 304.
(2) The geographical location of terminal 2004 is acquired from the measurement result message.
(3) The distance between base station 2002 and terminal 2004 is calculated. At the same time, the distance between base station 2003 and terminal 2004 is calculated.
(4) The difference between the distances between base station 2002 and terminal 2004 and between base station 2003 and terminal 2004 is calculated, and the calculated difference in distance is divided by the speed of light to calculate the time difference.
(5) The arrival time difference of the pilot signals of base stations 2002 and 2003 that has been calculated at terminal 2004 from the measurement result message is acquired.
(6) The time difference calculated in (4) is compared with the arrival time difference of the pilot signals of base stations 2002 and 2003 that was measured at terminal 2004 to calculate RTD.

(7) The RTD calculated in (6) is stored in memory 304.

In the present working example, all terminals having GPS positioning capability for carrying out hand-over carry out measurements for the RTD calculation, but a method can be considered for determining whether a terminal carries out measurement or not by means of the same method as in the third to eighth working examples of the present invention.

A method can further be considered for improving the measurement accuracy of RTD by calculating the average of the calculated RTD and RTD that is stored in memory 304, as described in the ninth working example of the present invention.

ELEVENTH WORKING EXAMPLE

In the tenth working example of the present invention, the specification of the geographical location of terminal 2004 was carried out by terminal 2004 itself, but a method can be considered in which this operation is performed by RNC 2001. In this case, the measurement results of the GPS signal that was received at terminal 2004 are contained in the measurement result report message that is transmitted from terminal 2004 in Step 2204, and RNC 2001 then calculates the location of terminal 2004 in Step 2205. Alternatively, a method can also be considered in which the calculation process is carried out by a positioning server and not by RNC 2001. These methods are described below as the eleventh working example.

Figure 21:
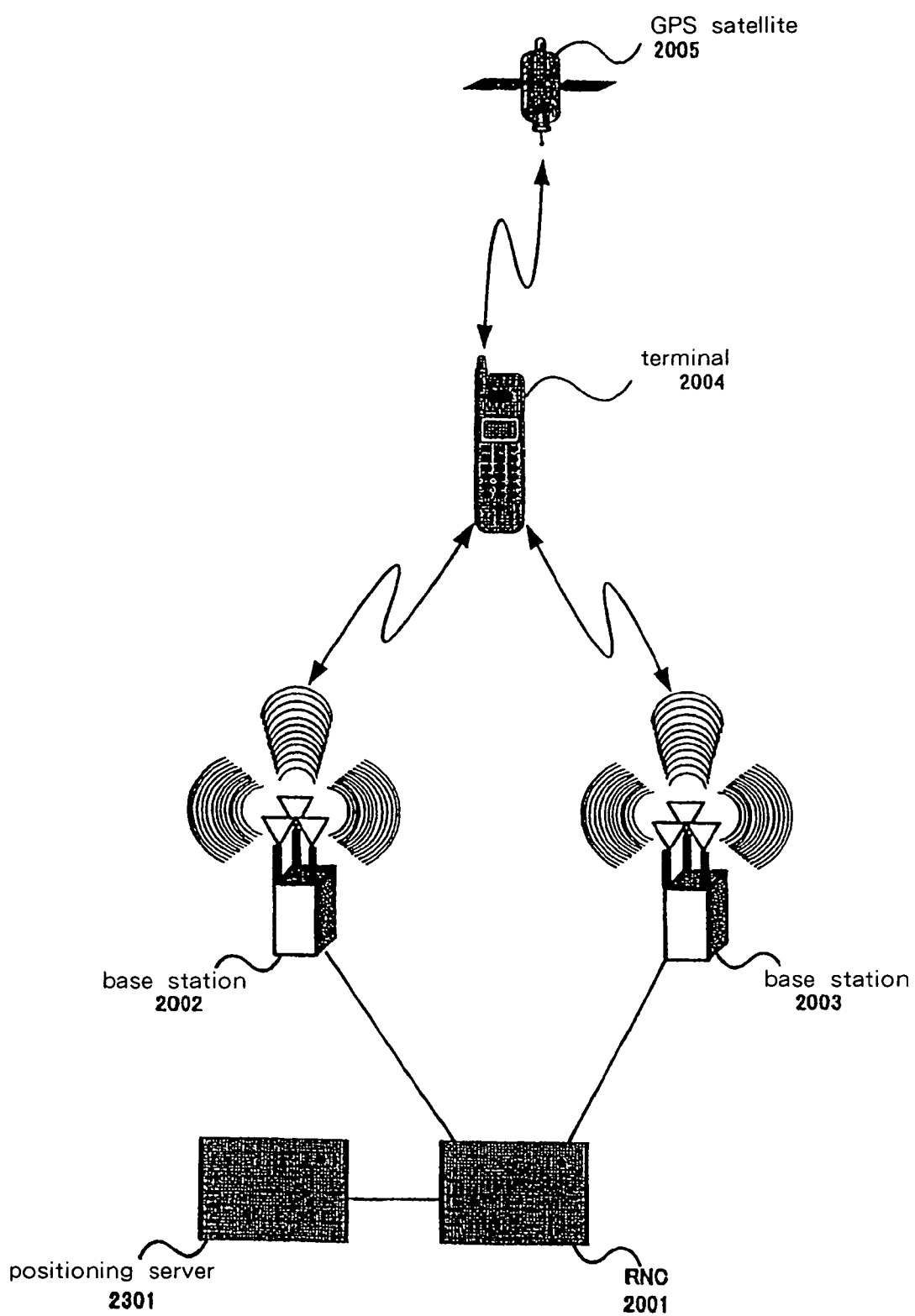
FIG. 21 shows the configuration of the transmission time difference measurement system in the eleventh working example of the present invention.

FIG. 21 shows the configuration of the transmission time difference measurement system in the eleventh working example of the present invention.

The transmission time difference measurement system shown in FIG. 21 is made up from: RNC 2001, base stations 2002 and 2003, terminal 2004, GPS satellite 2005, and positioning server 2301.

Positioning server 2301 receives a request from RNC 2001 and accordingly carries out a calculation process for calculating the location of terminal 2004 and reports the calculation result to RNC 2001.

Figure 22:
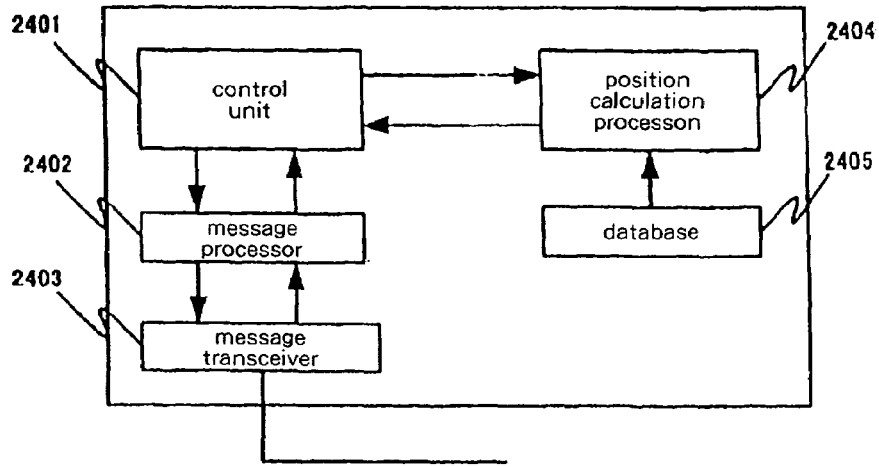
FIG. 22 shows the configuration of positioning server 2301 shown in FIG. 21.

FIG. 22 shows the configuration of positioning server 2301. In FIG. 22, only those portions necessary to the explanation are shown.

Positioning server 2301 shown in FIG. 22 is made up from: control unit 2401, message processor 2402, message transceiver 2403, position calculation processor 2404, and database 2405.

Control unit 2401 issues requests to position calculation processor 2404 to calculate the geographical location of terminal 2004 in accordance with the content of messages that are reported from message processor 2402. Control unit 2401 further issues a request to message processor 2402 to report to RNC 2001 the geographical location of terminal 2004 that has been reported from position calculation processor 2404.

When notified that a message has been received from message transceiver 2403, message processor 2402 checks the content of the received message and reports the content of the received message to control unit 2401. Message processor 2402 further receives a request from control unit 2401 to generate a message and issues a request to message transceiver 2403 to transmit the generated message.

Upon receiving the message from RNC 2001, message transceiver 2403 reports the reception of the message to message processor 2402. Message transceiver 2403 further transmits to RNC 2001 the message for which transmission has been requested from message processor 2402.

Position calculation processor 2404, upon receiving a request from control unit 2401, refers to database 2405 to carry out an operation for calculating the location of terminal 2004. Upon completing the calculation, position calculation processor 2404 reports the geographical location of terminal 2004, which is the result of calculation, to control unit 2401.

Database 2405 stores information such as the position information of satellites as information that is necessary for calculating the geographical location of terminal 2004. In the present working example, database 2405 is present within positioning server 2301, but database 2405 may also exist outside positioning server 2301.

Figure 23:
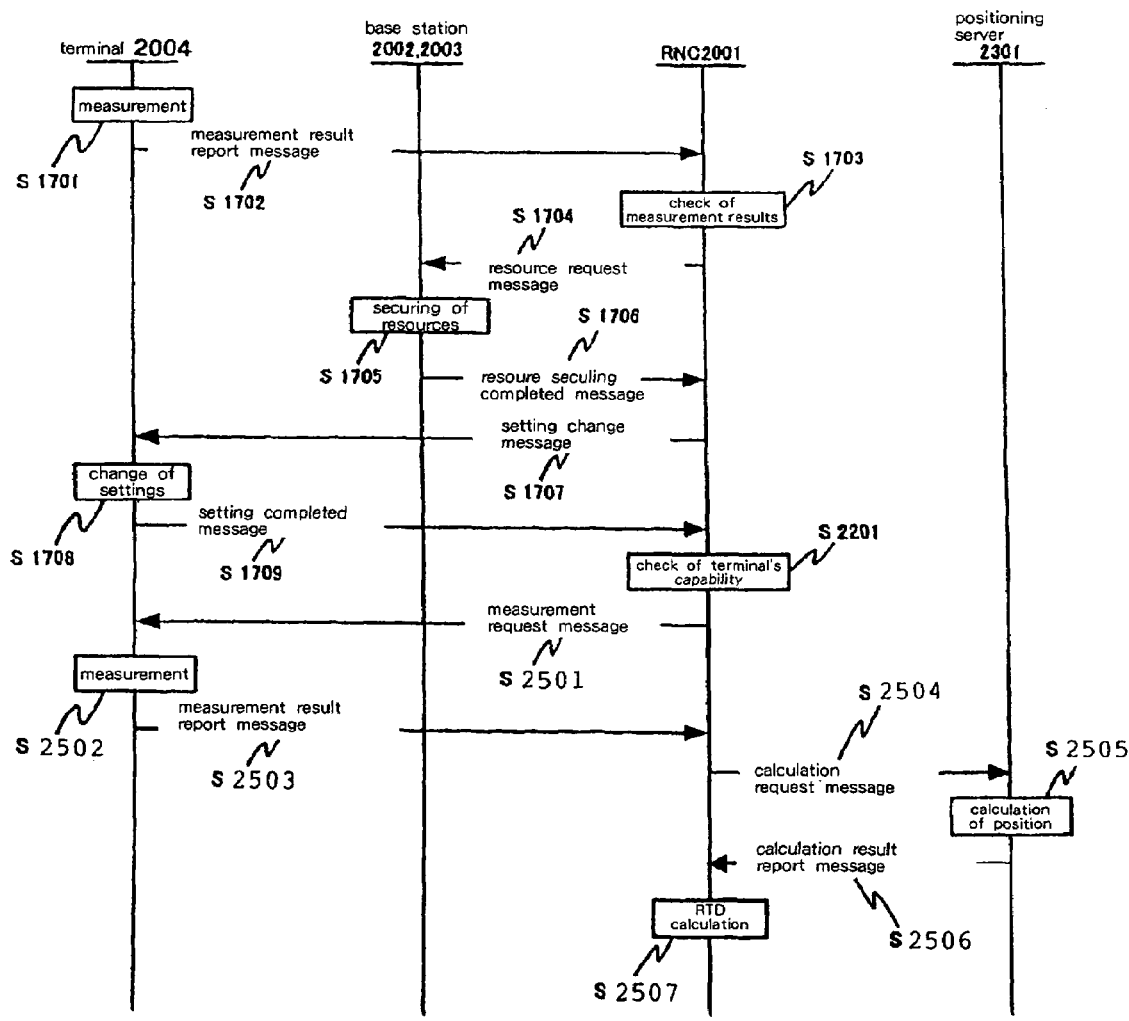
FIG. 23 is a view for explaining the sequence of the transmission time difference measurement method in the eleventh working example of the present invention.

FIG. 23 is a view for explaining the sequence of the transmission time difference measurement method in the eleventh working example of the present invention. Steps 1701 to 1709 and Step 2201 are identical to the tenth working example of the present invention and explanation is therefore here omitted.

In the present working example, terminal 2004 has the capability to receive GPS signals and control unit 301 therefore issues a request to message processor 302 to transmit to terminal 2004 a message to receive GPS signals and to measure the arrival time difference of pilot signals that are received from base stations 2002 and 2003.

Message processor 302 generates a measurement request message and issues a request to message transceiver 303 to transmit the generated message. Message transceiver 303 transmits the message that has been requested to terminal 2004 (Step 2501).

Message transceiver 1503, which receives the message by way of radio signal transceiver 1504, notifies message processor 1502 that a message has been received. Message processor 1502 verifies that the received message is a measurement request and notifies control unit 2101 that a measurement request message has been received from RNC 2001.

Control unit 2101 checks the reported content from message processor 1502 and verifies that the measurement of GPS signals and the measurement of the arrival time difference of pilot signals that are received from base stations 2002 and 2003 have been requested. Having verified the request content, control unit 2101 issues a request to position calculation unit 2103 to measure the GPS signals. At the same time, control unit 2101 issues a request to reception timing measurement unit 1505 to measure the times of reception of pilot signals from base stations 2002 and 2003.

Position calculation unit 2103 reports to control unit 2101 the content of the signals from the GPS satellite that have been measured by GPS signal receiver 2102.

Reception timing measurement unit 1505 measures the reception times of pilot signals received from base stations 2002 and 2003 as requested and reports the measurement results to control unit 2101 (Step 2502).

Control unit 2101, having been notified of the measurement results from reception timing measurement unit 1505, calculates the difference between the measured reception times and finds the arrival time difference of the pilot signals that are received from base stations 2002 and 2003.

Control unit 2101 issues a request to message processor 1502 to report to RNC 2001 the calculated arrival time difference and the measurement results of the GPS signals that have been reported from position calculation unit 2103.

Message processor 1502 generates a measurement result report message and issues a request to message transceiver 1503 to transmit the generated message. Message transceiver 1503 transmits the message for which transmission has been requested to RNC 2001 by way of radio signal transceiver 1504 (Step 2503).

Message receiver 303 of RNC 2001 that has received the measurement result report message from terminal 2004 reports the reception of the message to message processor 302. Message processor 302 verifies that the received message is a measurement result report message and notifies control unit 301 that a measurement result report message has been received from terminal 2004.

Control unit 301 issues a request to message processor 302 to issue a request to positioning server 2301 to request the calculation process. Message processor 302, having received the request, generates a calculation request message. The generated calculation request message contains the measurement result of the GPS signals that were reported from terminal 2004.

Message processor 302, having completed generation of the message, issues a request to message transceiver 303 to transmit the generated message. Message transceiver 303, having received the request, transmits the calculation request message to positioning server 2301 (Step 2504).

Message transceiver 2401 of positioning server 2301 that has received the message from RNC 2001 reports the reception of the message to message processor 2402. Message processor 2402, having received the report, verifies that the received message is a calculation request message and notifies control unit 2401 that a calculation request message has been received.

Control unit 2402, having received the report, issues a request to position calculation processor 2404 to carry out the calculation process. At this time, the measurement results of the GPS signals at terminal 2004 that are contained in the calculation request message are simultaneously reported.

Position calculation processor 2404, having received the request, refers to database 2405 to acquire the information necessary for the calculation process of the position information of the GPS satellite that has been measured by terminal 2004, carries out the calculation process, and specifies the geographical location of terminal 2004 (Step 2505). Position calculation processor 2404, upon completing the specification of the geographical location of terminal 2004, reports the geographical location of terminal 2004 to control unit 2401.

Control unit 2401, having received the report, issues a request to message processor 2402 to report the geographical location of terminal 2004 to RNC 2001. Message processor 2402, having received the request, generates a calculation result report message and issues a request to message transceiver 2403 to transmit the generated message. Message transceiver 2403, having received the request, transmits the calculation result report message to RNC 2001 (Step 2506).

Message transceiver 303 of RNC 2001 that has received the calculation result report message from positioning server 2301 reports the reception of the message to message processor 302. Message processor 302 that has received the report verifies that the received message is a calculation result report message and notifies control unit 301 that a calculation result report message has been received.

Control unit 301, having received the report, checks the content of the calculation result report message, whereupon the following processes (1)-(7) are executed (Step 2507):

(1) The geographical location of base stations 2002 and 2003 are acquired from memory 304.
(2) The geographical location of terminal 2004 is acquired from the calculation result message.
(3) The distance between base station 2002 and terminal 2004 is calculated. At the same time, the distance between base station 2003 and terminal 2004 is calculated.
(4) The difference between the distances between base station 2002 and terminal 2004 and between base station 2003 and terminal 2004 is calculated, and the calculated difference in distances is divided by the speed of light to calculate the time difference.
(5) The arrival time difference of the pilot signals of base stations 2002 and 2003 that is measured at terminal 2004 is acquired from the measurement result message.
(6) The time difference that was calculated in (4) is compared with the arrival time difference of the pilot signals of base stations 2002 and 2003 that was measured at terminal 2004 to calculate the RTD.
(7) The RTD calculated in (6) is stored in memory 304.

Although measurements for calculating the RTD are carried out by all terminals having the capability for GPS positioning in the present working example, a method can be considered in which the determination of whether a terminal carries out measurement is realized by a method similar to the third to eighth working examples of the present invention.

Alternatively, a method can be considered for improving the accuracy by taking the average of the calculated RTD as in the ninth working example of the present invention.

Yet another method can be considered for improving the measurement accuracy of RTD by calculating the average of the RTD that have been stored in memory 304 and RTD that are calculated as in the ninth working example of the present invention.

The invention claimed is:

1. A transmission time difference measurement method in a system having a terminal, two or more base stations that each operate asynchronously, and a control device for controlling the terminal and each of the base stations, said method calculating transmission time differences of signals in each of said base stations and comprising steps wherein:
when said terminal is able to simultaneously receive signals from each of said base stations,
each of said base stations uses a round trip time measurement function to measure the round trip times of signals to and from said terminal;
said terminal uses a turn-around time measurement function to measure, for each of said base stations, the turn-around time from the reception of a signal from the base station until the transmission of a signal to that base station;
said terminal uses an arrival time difference measurement function to measure the arrival time difference, which is the difference between the times that signals arrive from each of said base stations; and
said control device finds the difference in transmission times of signals in each of said base stations based on: the difference of propagation times between said terminal and each of said base stations that is calculated by subtracting the turn-around time that is measured in said terminal from the round trip time that is measured in each of said base stations, and the arrival time difference that is measured in said terminal; and uses a storage function to store the calculated transmission time differences in association with the calculation times at which the transmission time differences were calculated.

2. The transmission time difference measurement method according to claim 1, wherein each of said terminal, said base stations, and said control device carries out the processes of said steps only when said terminal is able to simultaneously receive signals from each of said base stations, and moreover, when said terminal is a specific terminal that satisfies predetermined conditions.

3. The transmission time difference measurement method according to claim 2, wherein, as said predetermined conditions, said turn-around time measurement function and said arrival time difference measurement function of said terminal can be realized with measurement accuracy that equals or exceeds measurement accuracy that has been prescribed in advance.

4. The transmission time difference measurement method according to claim 2, wherein, as said predetermined conditions, the number of times that said terminal has used said turn-around time measurement function and said arrival time difference measurement function to carry out measurements satisfies a predetermined condition.

5. The transmission time difference measurement method according to claim 2, further comprising a step wherein said terminal uses a reception quality measurement function to measure the reception quality of signals received from each of said base stations;
wherein, as said predetermined conditions, said reception quality that has been measured using said reception quality measurement function of said terminal satisfies a predetermined condition.

6. The transmission time difference measurement method according to claim 2, wherein, as said predetermined conditions, the transmission time differences of each of said base stations that have not been stored using said storage function, or the difference between the current time and said calculation time of said transmission time differences that have been stored using said storage function satisfies a predetermined condition.

7. The transmission time difference measurement method according to claim 2, wherein, as said predetermined conditions, said turn-around time measurement function and said arrival time difference measurement function of said terminal can be realized with measurement accuracy that equals or exceeds measurement accuracy that has been prescribed in advance, and moreover, the number of times that said terminal uses said turn-around time measurement function and said arrival time difference measurement function to carry out measurements satisfies a predetermined condition.

8. The transmission time difference measurement method according to claim 2, further comprising a step wherein said terminal uses a reception quality measurement function to measure the reception quality of signals received from each of said base stations;
wherein, as said predetermined conditions, said turn-around time measurement function and said arrival time difference measurement function of said terminal can be realized with measurement accuracy that equals or exceeds measurement accuracy that has been prescribed in advance, and moreover, said reception quality that has been measured using said reception quality measurement function of said terminal satisfies a predetermined condition.

9. The transmission time difference measurement method according to claim 2, wherein, as said predetermined conditions, said turn-around time measurement function and said arrival time difference measurement function of said terminal can be realized with measurement accuracy that equals or exceeds measurement accuracy that has been prescribed in advance, and moreover, the transmission time differences of each of said base stations that have not been stored using said storage function, or the difference between the current time and said calculation time of said transmission time differences that have been stored using said storage function satisfies a predetermined condition.

10. The transmission time difference measurement method according to claim 2, further comprising a step wherein said terminal uses a reception quality measurement function to measure the reception quality of signals received from each of said base stations;
wherein, as said predetermined conditions, the number of times that said terminal has used said turn-around time measurement function and said arrival time difference measurement function to carry out measurements satisfies a predetermined condition, and moreover, said reception quality that has been measured using said reception quality measurement function of said terminal satisfies a predetermined condition.

11. The transmission time difference measurement method according to claim 2, wherein as said predetermined conditions, the number of times that said terminal has used said turn-around time measurement function and said arrival time difference measurement function to carry out measurements satisfies a predetermined condition, and moreover, the transmission time differences of each of said base stations that have not been stored using said storage function, or the difference between the current time and said calculation time of said transmission time differences that have been stored using said storage function satisfies a predetermined condition.

12. The transmission time difference measurement method according to claim 2, further comprising a step wherein said terminal uses a reception quality measurement function to measure the reception quality of signals received from each of said base stations;
wherein, as said predetermined conditions, said reception quality that has been measured using said reception quality measurement function of said terminal satisfies a predetermined condition, and moreover, the transmission time differences of each of said base stations that have not been stored using said storage function, or the difference between the current time and said calculation time of said transmission time differences that have been stored using said storage function satisfies a predetermined condition.

13. The transmission time difference measurement method according to claim 2, further comprising a step wherein said terminal uses a reception quality measurement function to measure the reception quality of signals received from each of said base stations;
wherein, as said predetermined conditions, said turn-around time measurement function and said arrival time difference measurement function of said terminal can be realized with measurement accuracy that equals or exceeds measurement accuracy that has been prescribed in advance, the number of times that said terminal has used said turn-around time measurement function and said arrival time difference measurement function to carry out measurements satisfies a predetermined condition, and moreover, said reception quality that has been measured using said reception quality measurement function of said terminal satisfies a predetermined condition.

14. The transmission time difference measurement method according to claim 2, wherein, as said predetermined conditions, said turn-around time measurement function and said arrival time difference measurement function of said terminal can be realized with measurement accuracy that equals or exceeds measurement accuracy that has been prescribed in advance, the number of times that said terminal has used said turn-around time measurement function and said arrival time difference measurement function to carry out measurements satisfies a predetermined condition, and moreover, the transmission time differences of each of said base stations that have not been stored using said storage function, or the difference between the current time and said calculation time of said transmission time differences that have been stored using said storage function satisfies a predetermined condition.

15. The transmission time difference measurement method according to claim 2, further comprising a step wherein said terminal uses a reception quality measurement function to measure the reception quality of signals received from each of said base stations;

wherein, as said predetermined conditions, the number of times that said terminal has used said turn-around time measurement function and said arrival time difference measurement function to carry out measurements satisfies a predetermined condition, said reception quality that has been measured using said reception quality measurement function of said terminal satisfies a predetermined condition, and moreover, the transmission time differences of each of said base stations that have not been stored using said storage function, or the difference between the current time and said calculation time of said transmission time differences that have been stored using said storage function satisfies a predetermined condition.

16. The transmission time difference measurement method according to claim 2, further comprising a step wherein said terminal uses a reception quality measurement function to measure the reception quality of signals received from each of said base stations;

wherein, as said predetermined conditions, said turn-around time measurement function and said arrival time difference measurement function of said terminal can be realized with measurement accuracy that equals or exceeds measurement accuracy that has been prescribed in advance, the number of times that said terminal has used said turn-around time measurement function and said arrival time difference measurement function to carry out measurements satisfies a predetermined condition, said reception quality that has been measured using said reception quality measurement function of said terminal satisfies a predetermined condition, and moreover, the transmission time differences of each of said base stations that have not been stored using said storage function, or the difference between the current time and said calculation time of said transmission time differences that have been stored using said storage function satisfies a predetermined condition.

17. The transmission time difference measurement method according to claim 1, wherein, when said control device has already used said storage function to store transmission time differences, said control device calculates the average value of said transmission time differences that have already been stored using said storage function and said transmission time differences that have been calculated, and uses said storage function to store the average value that has been calculated as said transmission time differences.

18. The transmission time difference measurement method in a system having a terminal, two or more base stations that each operate asynchronously, and a control device for controlling the terminal and each of the base stations, said method calculating the differences in transmission times of signals in each of said base stations and comprising steps wherein:

when said terminal is able to simultaneously receive signals from each of said base stations, said terminal uses an arrival time difference measurement function to measure the arrival time difference, which is the difference between the times that signals arrive from each of said base stations, and, using a GPS positioning function, uses signals from a GPS satellite to specify the geographical location of said terminal; and said control device calculates the distances between said terminal and each of said base stations based on the geographical location of said terminal and the geographical locations of each of said base stations that have been measured by said terminal, finds the transmission time differences of each of said base stations based on the propagation time differences that are calculated by diving the differences between the calculated distances by the speed of light and the arrival time differences that are measured at said terminal, and uses the storage function to store the transmission time differences that have been calculated in associated with the calculation time at which the transmission time differences were calculated.

19. The transmission time difference measurement method according to claim 18, wherein each of said terminal and said control device carries out the processes of said steps only when said terminal can simultaneously receive signals from each of said base stations, and moreover, said terminal is a specific terminal that satisfies predetermined conditions.

20. The transmission time difference measurement method according to claim 19, further comprising a step wherein said terminal uses a reception quality measurement function to measure the reception quality of signals received from each of said base stations;

wherein, as said predetermined conditions, said reception quality that is measured using said reception quality measurement function of said terminal satisfies a predetermined condition.

21. The transmission time difference measurement method according to claim 19, wherein, as said predetermined conditions, the transmission time differences of each of said base stations that have not been stored using said storage function, or the difference between the current time and said calculation time of said transmission time differences that have been stored using said storage function satisfies a predetermined condition.

22. The transmission time difference measurement method according to claim 19, further comprising a step wherein said terminal uses a reception quality measurement function to measure the reception quality of signals received from each of said base stations;

wherein, as said predetermined conditions, said reception quality that has been measured using said reception quality measurement function of said terminal satisfies a predetermined condition, and moreover, the transmission time differences of each of said base stations that have not been stored using said storage function, or the difference between the current time and said calculation time of said transmission time differences that have been stored using said storage function satisfies a predetermined condition.

23. The transmission time difference measurement method according to claim 18, wherein, when said control device has already used said storage function to store said transmission time differences, said control device calculates the average value of said transmission time differences that have already been stored using said storage function and said transmission time differences that have been calculated, and uses said storage function to store the average value that has been calculated as said transmission time difference.

24. A transmission time difference measurement system comprising a terminal, two or more base stations that each operate asynchronously, and a control device for controlling said terminal and each of said base stations, said system calculating the transmission time differences of signals in each of said base stations; wherein:

said control device includes: a measurement request means for issuing requests for measurement to said terminal and said base stations; and storage means for storing the transmission time differences of signals of said base stations in association with calculation times at which said transmission time differences have been calculated;

each of said base stations includes a round trip time measurement means for, upon receiving a measurement request that said control device has transmitted using said measurement request means, measuring the round trip times of signals transmitted to and from said terminal; and said terminal includes: a turn-around time measurement means for, upon receiving a measurement request that said control device has transmitted using said measurement request means, measuring the turn-around time for receiving signals from said base stations until transmitting the signals to said base stations; and an arrival time difference measurement means for measuring the arrival time difference, which is the difference between the times at which signals from at least two base stations arrive;

and wherein, when said terminal is able to simultaneously receive signals from each of said base stations:

each of said base stations carries out a process of using said round trip time measurement means to measure each of the round trip times;

said terminal carries out processes of using said turn-around time measurement means to measure turn-around times for each of said base stations and of using said arrival time difference measurement means to measure arrival time differences; and said control device carries out processes of: finding the transmission time differences of signals in each of said base stations based on the propagation time differences between said terminal and each of said base stations that are calculated by subtracting the turn-around time that is measured in said terminal from the round trip times that have been measured in each of said base stations, and the arrival time difference that is measured in said terminal; and storing in said storage means the transmission time differences that have been calculated.

25. The transmission time difference measurement system according to claim 24, wherein said terminal, each of said base stations, and said control device carry out said processes only when said terminal is able to simultaneously receive signals from each of said base stations, and moreover, when said terminal is a specific terminal that satisfies predetermined conditions.

26. The transmission time difference measurement system according to claim 25, wherein, as said predetermined conditions, said turn-around time measurement means and said arrival time difference measurement means of said terminal are able to measure with measurement accuracy that equals or exceeds measurement accuracy that has been prescribed in advance.

27. The transmission time difference measurement system according to claim 25, wherein, as said predetermined conditions, the number of times that said terminal uses said turn-around time measurement means and said arrival time difference measurement means to carry out measurements satisfies a predetermined condition.

28. The transmission time difference measurement system according to claim 25, wherein said terminal further includes a reception quality measurement means for measuring the reception quality of signals received from each of said base stations;

wherein, as said predetermined conditions, said reception quality that has been measured using said reception quality measurement means of said terminal satisfies a predetermined condition.

29. The transmission time difference measurement system according to claim 25, wherein, as said predetermined conditions, the transmission time differences of each of said base stations that have not been stored in said storage means, or the difference between the current time and said calculation time of said transmission time differences that have been stored in said storage means satisfies a predetermined condition.

30. The transmission time difference measurement system according to claim 25, wherein, as said predetermined conditions, said turn-around time measurement means and said arrival time difference measurement means of said terminal are able to carry out measurements with measurement accuracy that equals or exceeds measurement accuracy that has been prescribed in advance, and moreover, the number of times that said terminal uses said turn-around time measurement means and said arrival time difference measurement means to carry out measurements satisfies a predetermined condition.

31. The transmission time difference measurement system according to claim 25, wherein said terminal further includes reception quality measurement means for measuring the reception quality of signals received from each of said base stations; and wherein, as said predetermined conditions, said turn-around time measurement means and said arrival time difference measurement means of said terminal are able to measure with measurement accuracy that equals or exceeds measurement accuracy that has been prescribed in advance, and moreover, said reception quality that has been measured using said reception quality measurement means of said terminal satisfies a predetermined condition.

32. The transmission time difference measurement system according to claim 25, wherein, as said predetermined conditions, said turn-around time measurement means and said arrival time difference measurement means of said terminal can carry out measurements with measurement accuracy that equals or exceeds measurement accuracy that has been prescribed in advance, and moreover, the transmission time differences of each of said base stations that have not been stored in said storage means, or the difference between the current time and said calculation time of said transmission time differences that have been stored in said storage means satisfies a predetermined condition.

33. The transmission time difference measurement system according to claim 25, wherein said terminal further includes reception quality measurement means for measuring the reception quality of signals received from each of said base stations; and wherein, as said predetermined conditions, the number of times that said terminal uses said turn-around time measurement means and said arrival time difference measurement means to carry out measurements satisfies a predetermined condition, and moreover, said reception quality that has been measured using said reception quality measurement means of said terminal satisfies a predetermined condition.

34. The transmission time difference measurement system according to claim 25, wherein, as said predetermined conditions, the number of times that said terminal uses said turn-around time measurement means and said arrival time difference measurement means to carry out measurements satisfies a predetermined condition, and moreover, the transmission time differences of each of said base stations that have not been stored in said storage means, or the difference between the current time and said calculation time of said transmission time differences that have been stored in said storage means satisfies a predetermined condition.

35. The transmission time difference measurement system according to claim 25, wherein said terminal further includes reception quality measurement means for measuring the reception quality of signals received from each of said base stations; and as said predetermined conditions, said reception quality that has been measured using said reception quality measurement means of said terminal satisfies a predetermined condition, and moreover, the transmission time differences of each of said base stations that have not been stored in said storage means, or the difference between the current time and said calculation time of said transmission time differences that have been stored in said storage means satisfies a predetermined condition.

36. The transmission time difference measurement system according to claim 25, wherein said terminal further includes reception quality measurement means for measuring the reception quality of signals received from each of said base stations; and as said predetermined conditions, said turn-around time measurement means and said arrival time difference measurement means of said terminal can carry out measurements with measurement accuracy that equals or exceeds measurement accuracy that has been prescribed in advance, the number of times that said terminal uses said turn-around time measurement means and said arrival time difference measurement means to carry out measurements satisfies a predetermined condition, and moreover, said reception quality that has been measured using said reception quality measurement means of said terminal satisfies a predetermined condition.

37. The transmission time difference measurement system according to claim 25, wherein, as said predetermined conditions, said turn-around time measurement means and said arrival time difference measurement means of said terminal can carry out measurements with measurement accuracy that equals or exceeds measurement accuracy that has been prescribed in advance, the number of times that said terminal uses said turn-around time measurement means and said arrival time difference measurement means to carry out measurements satisfies a predetermined condition, and moreover, the transmission time differences of each of said base stations that have not been stored in said storage means, or the difference between the current time and said calculation time of said transmission time differences that have been stored in said storage means satisfies a predetermined condition.

38. The transmission time difference measurement system according to claim 25, wherein said terminal further includes reception quality measurement means for measuring the reception quality of signals received from each of said base stations; and as said predetermined conditions, the number of times that said terminal uses said turn-around time measurement means and said arrival time difference measurement means to carry out measurements satisfies a predetermined condition, said reception quality that has been measured using said reception quality measurement means of said terminal satisfies a predetermined condition, and moreover, the transmission time differences of each of said base stations that have not been stored in said storage means, or the difference between the current time and said calculation time of said transmission time differences that have been stored in said storage means satisfies a predetermined condition.

39. The transmission time difference measurement system according to claim 25, wherein said terminal further includes reception quality measurement means for measuring the reception quality of signals received from each of said base stations; and as said predetermined conditions, said turn-around time measurement means and said arrival time difference measurement means of said terminal can carry out measurements with measurement accuracy that equals or exceeds measurement accuracy that has been prescribed in advance, the number of times that said terminal uses said turn-around time measurement means and said arrival time difference measurement means to carry out measurements satisfies a predetermined condition, said reception quality that has been measured using said reception quality measurement means of said terminal satisfies a predetermined condition, and moreover, the transmission time differences of each of said base stations that have not been stored in said storage means, or the difference between the current time and said calculation time of said transmission time differences that have been stored in said storage means satisfies a predetermined condition.

40. The transmission time difference measurement system according to claim 24, wherein, when said transmission time differences are already stored in said storage means, said control means calculates the average value of said transmission time differences that are already stored in said storage means and said transmission time differences that have been calculated, and stores this calculated average value in said storage means as said transmission time differences.

41. The transmission time difference measurement system comprising a terminal, two or more base stations that each operate asynchronously, and a control device for controlling said terminal and each of said base stations, said system calculating the transmission time differences of signals in each of said base stations; wherein:

said control device includes: a measurement request means for issuing requests for measurement to said terminal; and storage means for storing the transmission time differences of signals of said base stations in association with calculation times at which said transmission time differences have been calculated;

said terminal includes an arrival time difference measurement means for, upon receiving a measurement request that said control device has transmitted using said measurement request means, measuring the arrival time difference, which is the difference between the times at which signals from at least two base stations arrive; and at least one of said terminal and said control device includes a GPS positioning means for using signals from a GPS satellite to specify the geographical location of terminals;

and wherein, when said terminal is able to simultaneously receive signals from each of said base stations:

said terminal carries out a process of using said arrival time difference measurement means to measure the arrival time difference;

at least one of said terminal and said control device carries out a process of using said GPS positioning means to specify the geographical location of terminals; and said control device carries out processes of: calculating the distances between said terminal and each of said base stations based on the geographical location of said terminal and the geographical locations of each of said base stations that have been measured, finds the transmission time differences of each of said base stations based on the propagation time difference that is calculated by dividing the differences in calculated distances by the speed of light and the arrival time difference that has been measured at said terminal, and storing the transmission time differences that have been calculated in said storage means.

42. The transmission time difference measurement system according to claim 41, wherein each of said terminal and said control device carry out said processes only when said terminal is able to simultaneously receive signals from each of said base stations, and moreover, when said terminal is a specific terminal that satisfies predetermined conditions.

43. The transmission time difference measurement system according to claim 42, wherein said terminal further includes a reception quality measurement means for measuring reception quality of signals received from each of said base stations; and wherein, as said predetermined conditions, said reception quality that has been measured using said reception quality measurement means of said terminal satisfies a predetermined condition.

44. The transmission time difference measurement system according to claim 42, wherein, as said predetermined conditions, the transmission time differences of each of said base stations that have not been stored in said storage means, or the difference between the current time and said calculation time of said transmission time differences that have been stored in said storage means satisfies a predetermined condition.

45. The transmission time difference measurement system according to claim 42, wherein said terminal further includes a reception quality measurement means for measuring reception quality of signals received from each of said base stations; and wherein, as said predetermined conditions, said reception quality that has been measured using said reception quality measurement means of said terminal satisfies a predetermined condition, and moreover, the transmission time differences of each of said base stations that have not been stored in said storage means, or the difference between the current time and said calculation time of said transmission time differences that have been stored in said storage means satisfies a predetermined condition.

46. The transmission time difference measurement system according to claim 41, wherein, when said transmission time differences are already stored in said storage means, said control means calculates the average value of said transmission time differences that are already stored in said storage means and said transmission time differences that have been calculated, and stores this calculated average value in said storage means as said transmission time difference.

* * * * *